(12) United States Patent
McCrory

(10) Patent No.: US 6,202,944 B1
(45) Date of Patent: Mar. 20, 2001

(54) MATERIAL SPREADING APPARATUS

(75) Inventor: Kevin Richard McCrory, Chilliwack (CA)

(73) Assignee: Ty-Crop Manufacturing Ltd., Chilliwack (CA)

( * ) Notice: Subject to any disclaimer, the term of this patent is extended or adjusted under 35 U.S.C. 154(b) by 0 days.

(21) Appl. No.: 09/243,113

(22) Filed: Feb. 3, 1999

(51) Int. Cl.[7] ............................................. A01C 19/00
(52) U.S. Cl. .................... 239/658; 239/665; 239/673; 239/679
(58) Field of Search .................. 239/658, 672, 239/679, 673, 677, 665

(56) References Cited

U.S. PATENT DOCUMENTS

| | | |
|---|---|---|
| 927,141 * | 7/1909 | Hackney ............................. 239/679 |
| 3,097,851 * | 7/1963 | Cohrs et al. ........................ 239/679 |
| 4,124,167 * | 11/1978 | Coleman ............................ 239/673 |
| 4,438,873 | 3/1984 | Kaercher, Jr. . |
| 5,307,952 | 5/1994 | Worrel et al. . |
| 5,307,965 | 5/1994 | Worrel . |
| 5,478,104 | 12/1995 | Worrel et al. . |

FOREIGN PATENT DOCUMENTS

0404141 * 12/1990 (DE) ..................................... 239/665

1447309 * 12/1988 (SU) ..................................... 239/672

* cited by examiner

Primary Examiner—Andres Kashnikow
Assistant Examiner—Christopher S. Kim
(74) Attorney, Agent, or Firm—Miles & Stockbridge P.C.; John C. Kerins

(57) ABSTRACT

A versatile and easily serviceable material spreading apparatus of the type for movement over a ground surface while broadcasting a material along a path on the ground surface. The apparatus includes a belt cartridge which can be slid into or pulled out of a chassis compartment having ledges for supporting the cartridge. The belt cartridge provides an upper flight on which material is carried from a hopper supported on the chassis to a broadcasting unit carried at one end of the chassis. A plurality of broadcasting units each of which has an attachment component, which in combination with a mating attachment component carried by the chassis, permits quick fastening and removal of each unit relative to the chassis. One of the broadcasting units mounts an elongated rotatable member below a drop-offend of the upper flight of the belt cartridge, and the rotatable member is driven in a direction so that the upper rotating periphery of the rotating member propels the material upward and away from the chassis. The rotating member has strips of bristles which spiral around a core of the member towards opposite ends thereof so that the material also has imparted to it from bristles of the rotating member a direction of flight having a side-ways component to thereby increase the width of the path of distribution.

17 Claims, 16 Drawing Sheets

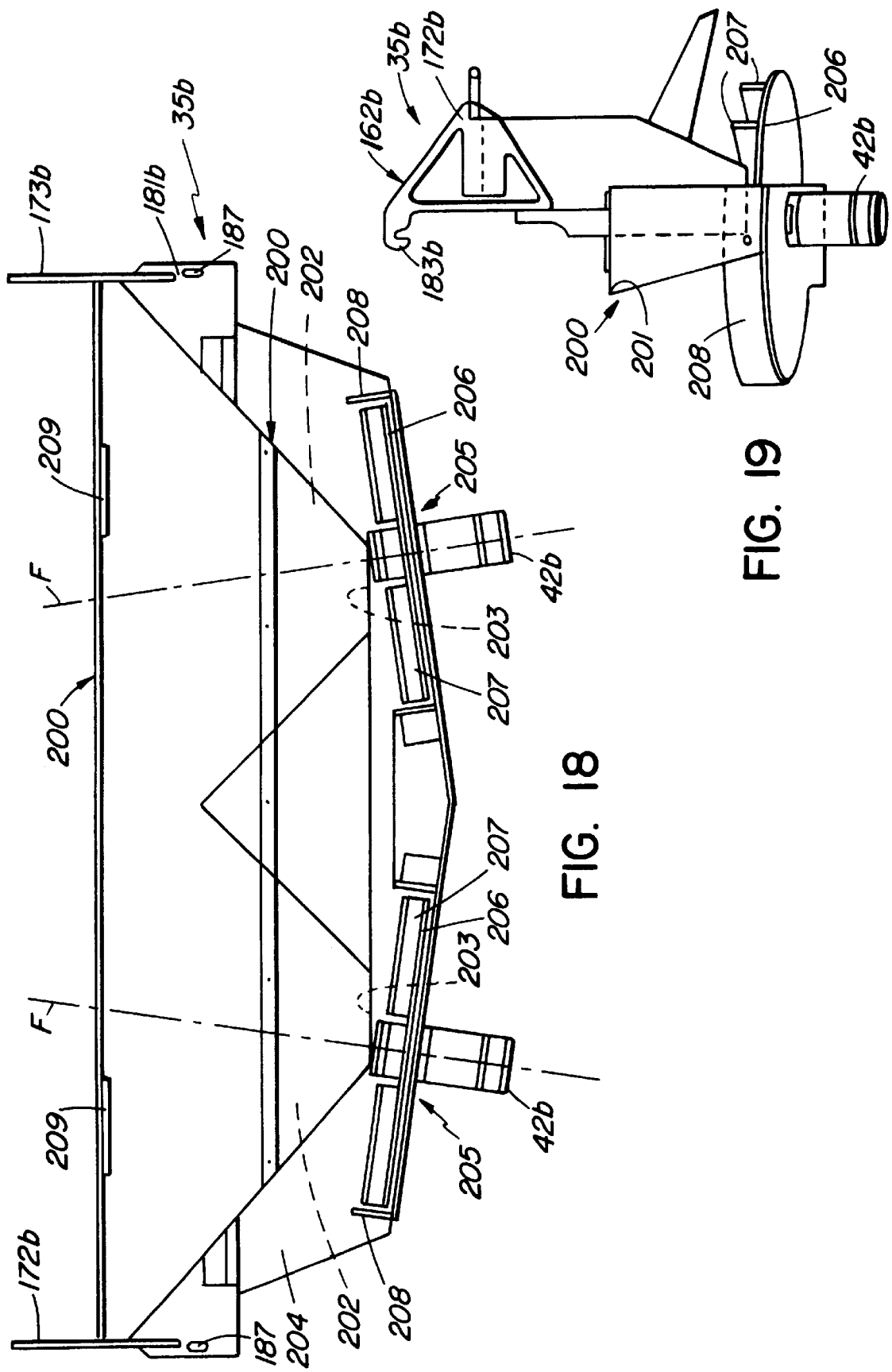

MATERIAL SPREADING APPARATUS

FIELD OF INVENTION

This invention relates to a material spreader for broadcasting granular material, such as sand, top soil, fertilizers, and the like over the ground surface, and particularly for top dressing turf.

BACKGROUND OF INVENTION

Material spreaders, whether of the pull type or self propelled, are in common use for applying dressings to turfs such as ground surfaces used for various athletic activities, and especially on the various ground surfaces forming golf courses. Such spreaders commonly include a hopper and a moving belt which passes under the hopper for carrying material which has been dumped into the hopper to a point exterior of the hopper where the material is engaged by means, such as a rotating brush, for transferring the material from the belt to the ground surface.

In order to maintain the maximum quality of turf conditions on golf courses, various techniques of best applying different materials are developing. Known spreaders, are usually equipped with a conventionally structured rotating brush which is usually mounted at the rear of the moving belt with its central axes of rotation spaced behind and somewhat above the upper belt surface carrying a layer of material from the hopper. The brush is located relative to the belt so that outer ends of bristles of the brush engage the particles of the material nearing a drop-off point on the belt and fling the particles downwardly into the turf. It has been found that depending on the type of material being dispensed, the condition of the turf, the required density of the material on the turf, etc., better results of applying the material can be achieved under some conditions if a different process of broadcasting the material is used.

The design characteristics and location of the brushes utilized for dispersing the material from moving belts have remained generally constant and have been provided in the main for driving the particles of the material downward with a force sufficient to penetrate to the base of the turf While this type of broadcasting of the material has advantages under some conditions, such as that of filling holes left after aerofication by use of a heavy application, such broadcasting is certainly not most desirable under all conditions.

In the main with known top dressers, provisions have not been made for modification of the machine for achieving the spreading of the material in a manner providing different characteristics of application. Generally personnel utilized in turf grooming are not sufficiently skilled in machine maintenance and servicing to undertake work involving any mechanical complexity, and therefore, if major changes are required or are of a time consuming nature, it would be usual practice to use the machine for top dressing only in the manner for which the machine was basically designed.

Also, available top dressers now in use on golf course turf groomers are not overall constructed for ready service and maintenance. One component of such machines, for example, requiring routine servicing and repair or replacement of parts, is the moving belt which carries the material from the hopper and the related parts for mounting and driving the belt, due to this components continued exposure to abrasive particles, dust and the like. In known structures, this component's particular location requires a major dissembling of the overall machine for removal of the belt and associated parts, thus resulting in work usually beyond the ability of the available staff at a golf course.

SUMMARY OF THE INVENTION

It is an object of the present invention to provide a moving belt component capable of being readily removable from the apparatus for the purpose of ready servicing and maintenance.

It is an object of another aspect of the present invention to provide a top dressing apparatus which is of simple and economical design and may be readily modified for applications of different materials suitable for achieving the best type of grooming methods of the turf.

An object of yet another aspect of the invention is to provide a brush device allowing for broadcasting of material in a manner significantly different than which is possible with conventional brushes designed to go beyond the surface of turf and penetrate the turf canopy.

The present invention generally resides in features of a material spreading apparatus of the type for movement over a ground surface while broadcasting a material along a path or strip on the ground surface.

According to one aspect of the apparatus, there is provided a chassis, a hopper carried on the chassis for containing the material and defining an opening for metered flow of the material from the hoper, a conveyor system for receiving the material from the opening of the hopper and delivering the material to one end of the chassis, and a material broadcasting unit attached to the one end of the chassis for receiving the material from the conveyor system and distributing the material over the path on the ground surface. The conveyor system may be in the form of a self-contained belt cartridge which includes a framework having a pair of side rails, a continuous belt and mounting means carried between the side rails and drivingly supporting the continuous belt to provide an upper material carrying flight movable in a direction from one end of the cartridge to the other. The chassis has means forming ledges for removably mounting the belt cartridge in an operative position within the chassis.

As indicated above, the conveyor system in top dressers and the like is one part of the apparatus requiring more frequent maintenance and servicing. In the above described embodiment of the invention, where the conveyor system is in the form of a self contained cartridge which can be easily taken from its mount on the chassis, its removal as a complete unit for servicing separate from the remainder of the apparatus significantly simplifies care of the apparatus.

According to another aspect of the present invention, the chassis includes a pair of laterally spaced side walls having rear ends at a rear end of the chassis, and there are provided a plurality of interchangeable broadcasting units for attachment to the rear end of the chassis. A first attachment means is carried on each of the side walls adjacent to but forward of the rear ends of the walls, and a first abutment means is carried at the rear end of the chassis. Each of the broadcasting units includes a frame supporting a main body portion for positioning rearwardly of the rear end of the chassis when the broadcasting unit is attached to the chassis. Second abutment means is formed at a forward side of the main body portion of the unit, and the frame of the broadcasting unit has forwardly projecting portions substantially aligned with the side walls of the chassis with second attachment means provided on the forwardly projecting portion of the frame for interacting with the first attaching means so as to interlock therewith and thereby suspend the broadcasting unit behind the rear end of the chassis. The main body portion of the broadcasting unit provides a center of gravity rearwardly of the abutment means when the unit is attached. Accordingly, on suspending the broadcasting unit by way of the attachment means, the second abutment means is held in engagement with the first abutment means by the weight of the unit under normal operating conditions.

By providing broadcasting units having different distributing characteristics, top dressing can be carried out in a more effective manner under different conditions, and it is desirable, therefore to have available different units which can be readily substituted, and particularly where it is possible to lift one unit off and install another by hand by way of a quick connect mechanism.

According to yet another aspect of he invention there is provided a broadcasting unit for mounting at one end of the chassis of the material spreading apparatus with a rotatable member disposed below a drop-off end of the conveyor system and for propelling the material dropping from the conveyor system in a direction having components of travel both outwardly away from the chassis and at least slightly upward. The broadcasting unit has a frame including a pair of spaced side members with an elongated rotatable member mounted between the side members and having a length substantially equal to the width of the top flight of the conveyor system. The rotatable member is formed by a central core member and plurality of radially extending, material engaging elements affixed at inner ends to the core member and having outer ends disposed in an outer peripheral shape of a generally cylindrical configuration. Drive means is provided for rotating the rotatable member in a direction causing the top of the periphery of the rotatable member disposed below the drop-offend of the conveyor system to travel in a direction away from the chassis so as to propel the material in a direction of travel as indicated above.

The broadcasting unit just described provides a type of distribution more suitable for top dressing turf under varied conditions and appears more effective with a wide variety of materials.

BRIEF DESCRIPTION OF DRAWINGS

FIG. 18 is a rear view of another form of a broadcasting unit in the form of a twin spinner apparatus also adapted for connection to the apparatus by the attachment system of the present invention; and FIG. 19 is a side view of the twin spinner apparatus as shown in FIG. 18.

DETAILED DESCRIPTION OF EMBODIMENTS OF THE INVENTION

Figure 1:
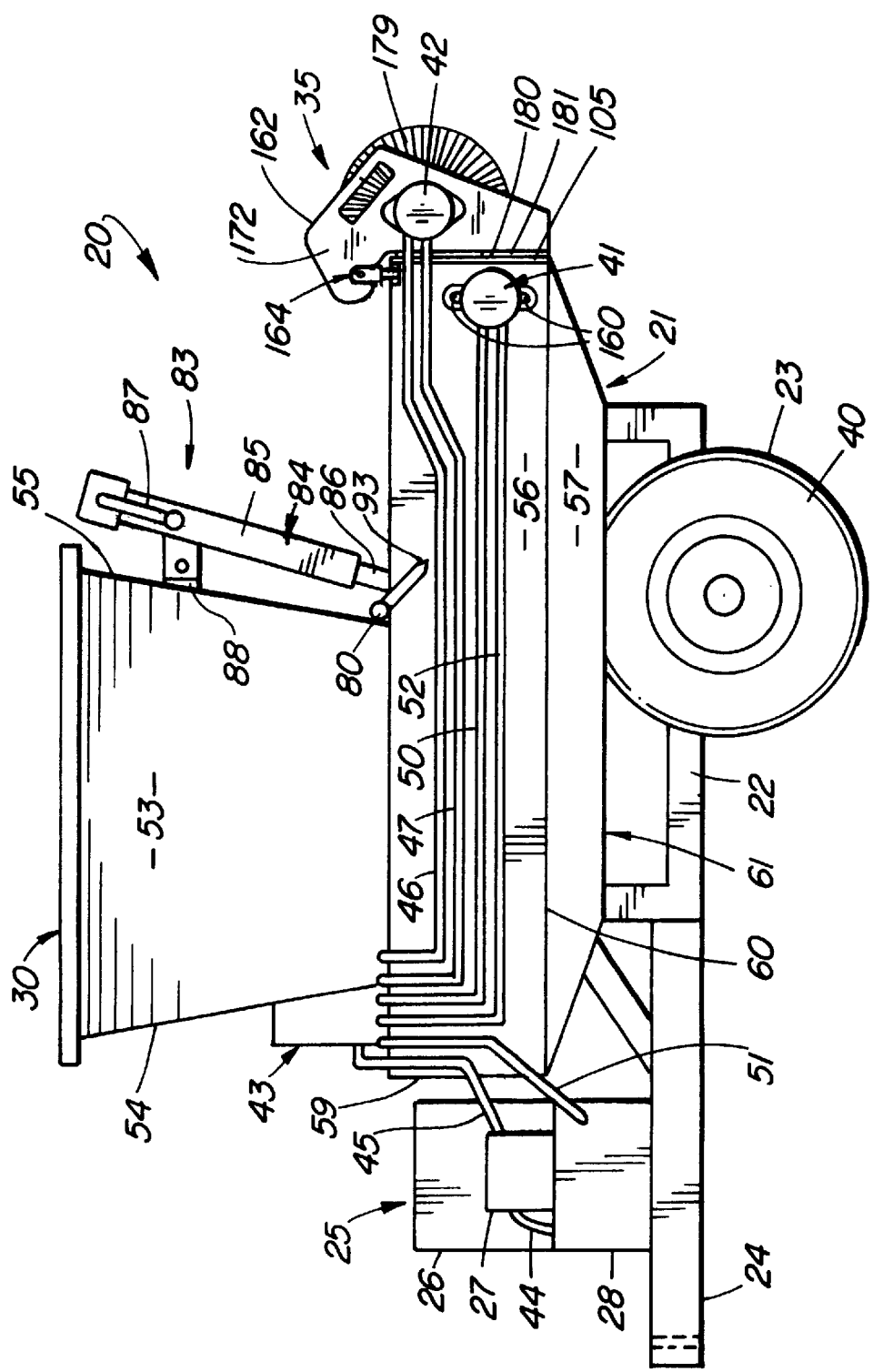
FIG. 1 is a side view of one embodiment of the overall apparatus of the present invention and incorporating one specific attachment having a bracket system to permit ready connecting to and removal from the apparatus.

Referring to the accompanying drawings in which reference characters are used to denote like parts referred to hereinafter, the number 20 denotes generally a material spreading apparatus of one embodiment of the present invention, the apparatus 20 having a chassis structure 21 including a lower framework 22 carried on two sets 23,23 of wheels. The framework 22 has a forwardly extending rigid tongue 24 adapted to be connected to a prime mover or towing device (not shown) such as a tractor. Mounted on the tongue 24 is a self contained power unit 25 for producing pressurized hydraulic fluid, the unit 25 including an engine 26, a pump 27 driven by engine 26 and a hydraulic fluid reservoir 28. An open-topped hopper 30 for containing a supply of the material to be spread is mounted on the chassis near the front thereof and extends substantially across its width. Contained within the chassis is a conveyor means 31 which is in the form of a belt cartridge 32 including a continuous belt 33 providing a top or upper flight 34 extending substantially the full length of the chassis and adapted to travel from under the hopper at the front to an open rear end of the chassis structure 21. Attached to the rear of the chassis structure is a material broadcasting unit 35 which is driven to deliver to the ground surface over which apparatus is travelling the material delivered from the hopper 30 to the rear of the chassis structure by the travelling upper flight 34 of the belt cartridge 32.

Figure 3:
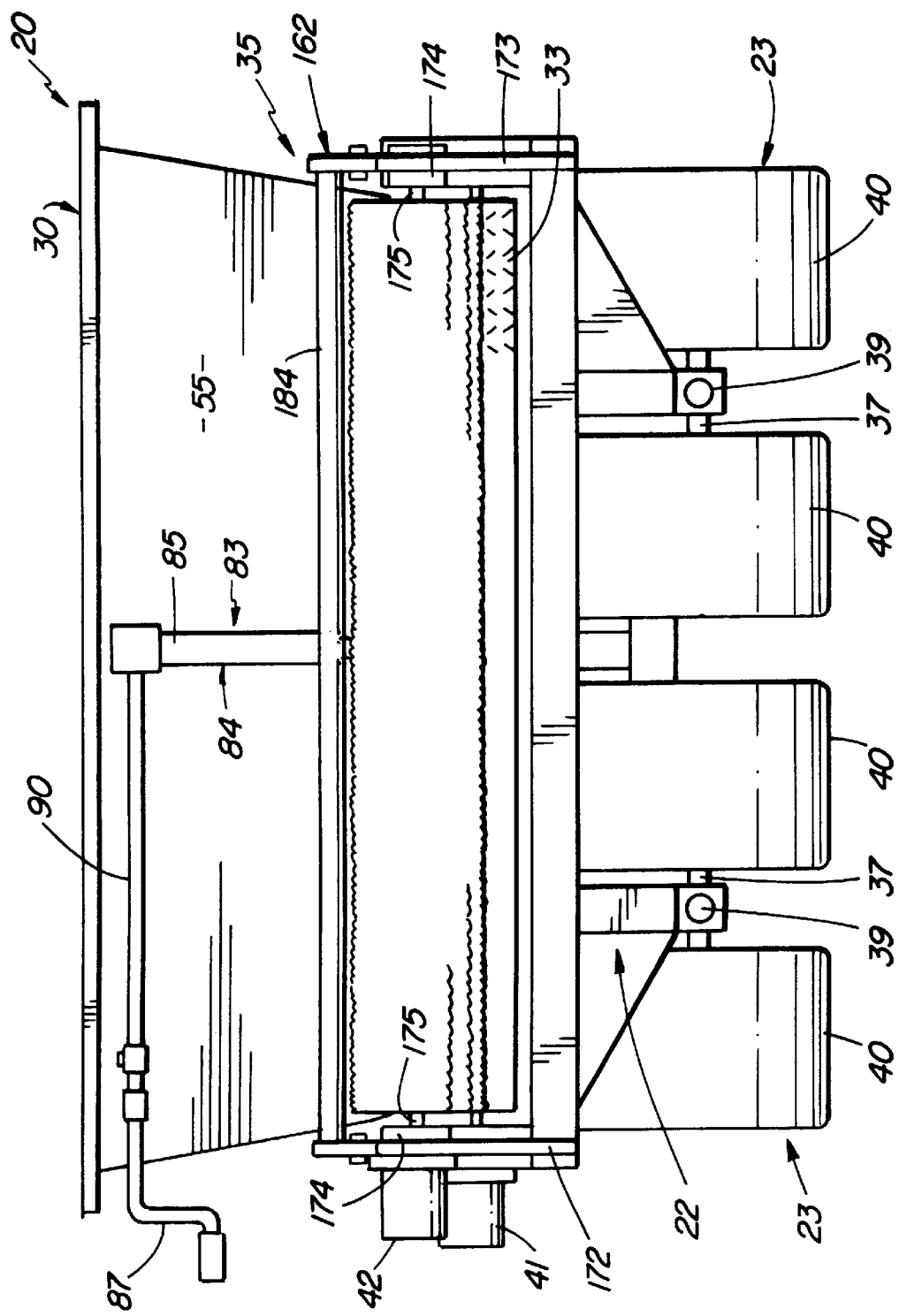
FIG. 3 is a rear view of the apparatus as shown in FIGS. 1 and 2.

The manner in which the chassis structure 21 is mounted on the two sets 23,23 of wheels may be observed from FIG. 3. Each set 23 of wheels includes a pair of laterally spaced wheels 36,36 mounted for free rotation on a transversely extending axle 37. The two axles 37,37 are each intermediately connected independently to the framework 22 by way of a shaft 39, the axes of which extend in the longitudinal direction of the apparatus 20 and is mounted in the framework in a manner to allow the axles 37,37 to independently rock about their longitudinal axes. Tires 40 of the wheels 36 are of a low pressure type, and because of the number of wheels and the manner in which the two sets of wheels are able to independently rock, the apparatus 20 is particularly suited for travel on the soft and rolling turfs of golf courses while imparting no tire marks or scuffing thereto.

It will be apparent that while the present invention is shown as being in the form of a towed top dresser including its own power unit for operating the belt cartridge 32 and broadcasting unit 35, the present invention may be incorporated into a self propelled unit including the operator's station, or the apparatus may be produced without wheels, or any other ground supporting means, and modified for mounting on the rear of an existing truck chassis. Also, the apparatus 10 may be produced without a self-contained power unit but instead have hydraulic couplings for ready connection to a hydraulic system of the prime mover or of the self propelled unit of which it is a part.

Figure 2:
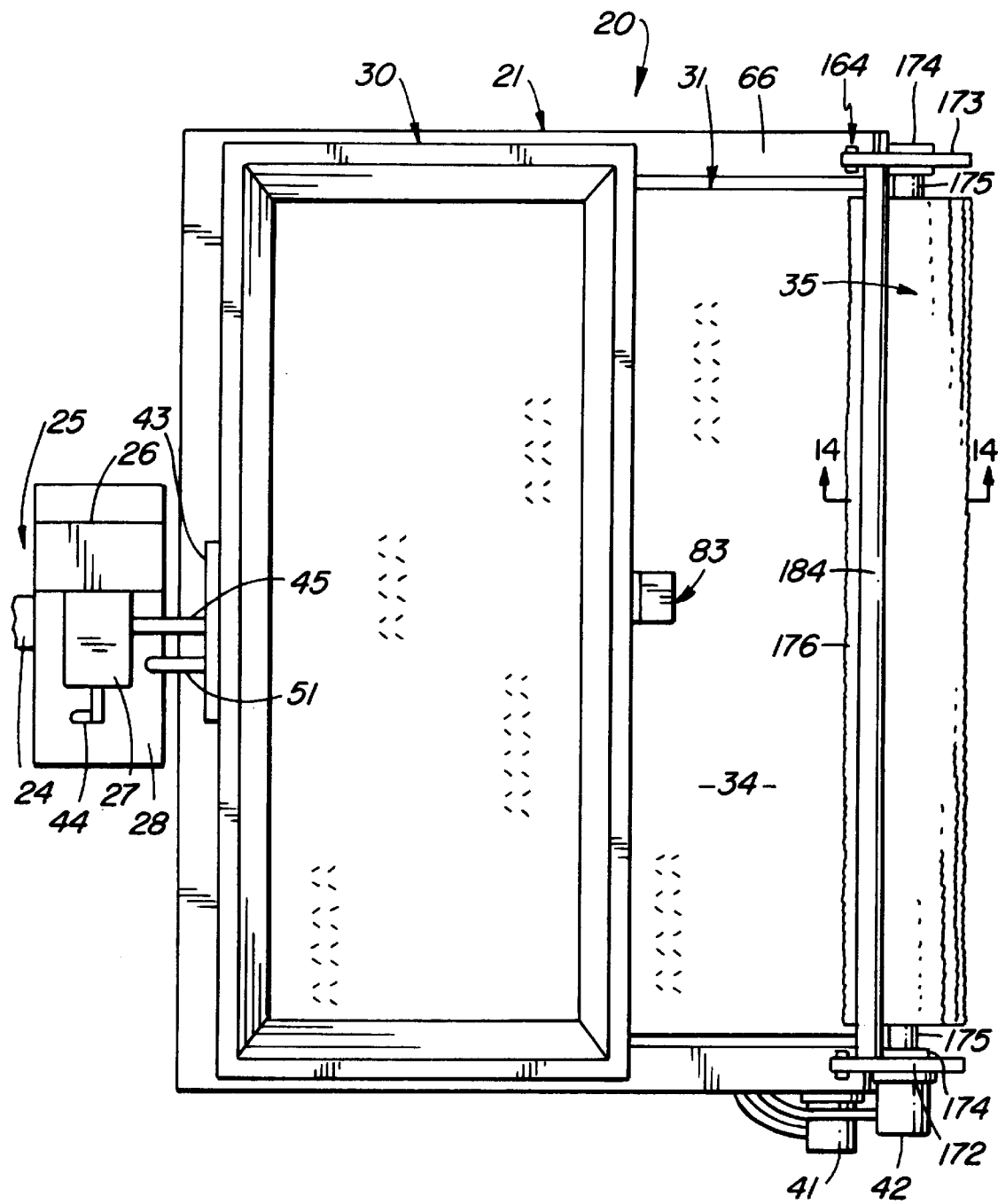
FIG. 2 is a top view of the apparatus as shown in FIG. 1.

In the illustrated embodiment, shown in FIGS. 1 to 3, there are two motor means 41, and 42 which separately drive the belt 33 of the belt cartridge 32 and the rotating part of the broadcasting unit 35, respectively. In one form of an attachment providing the broadcasting unit described below, the motor means 42 includes two separate motors which are used in the broadcasting unit but operate in series flow from a single control valve. The flow of pressurized hydraulic fluid from pump 27 to the motor means 41 and 42 is governed by the setting of control unit 43 mounted on the chassis structure 21 in front of the hopper 30 and adjacent the power unit 25. The pump 27 draws fluid from the reservoir 28 through line 44 and delivers pressurized fluid to the control unit 43 via line 45. A first control valve (not shown) of the control unit 43 is provided for direction flow from line 45 to a supply line 46 (FIG. 1) extending to motor means 42 of the broadcasting unit 35. A return line 47 extends from motor means 42 back to the control unit 43. A second control valve (not shown) of the control unit 43 receives flow from the return line 47 and may be set to direct a certain portion of the fluid returning from the motor means 41 to a supply line 50 extending to the motor means 41 which provides drive for the continuous belt 33. Any portion of the returning fluid from motor means 42 not directed to the motor means 41 through supply line 50 is returned by the control unit 43 to the reservoir 28 via a return line 51. After the fluid supplied via supply line 50 to the motor means 41 passes through the motor, it flows back to the control unit 43 by way of return line 52 and is directed by the control unit back to the reservoir via the return line 51.

It is a known feature in commercially available material spreaders to control the speed of the conveyor delivering the material from the hopper in relation to the speed of travel of the spreader, usually by providing a conveyor drive chain which is driven by a sprocket carried by a ground engaging wheel of the spreader. It is preferable, however, not to use ground engaging wheels which are not free wheeling in every respect because resistance to turning of a wheel can on occasion cause scuffing of the delicate turf In the above described system of driving the belt and broadcasting unit of the present invention, it would be acceptable in operation to utilize an engine which is governed for a constant rpm output, so that the flow output of the pump 27 would also be constant. Depending on the type of broadcasting units utilized it could be usual practice to select a particular motor means 42 therefor which operates at a desired constant speed due to the total output flow of the pump 27 delivered for the constant rpm of the engine, thus making it unnecessary to modify the flow to the broadcasting unit by a settable valve in the control unit 43. Moreover, as will be described further below the amount of material carried from the hopper 30 by the belt 33 is easily adjustable by a hopper outlet means 73 so that normally it would not be necessary to adjust the control valve which redirects a portion of the flow returning from the motor means 42 for the flow to the motor means 41, or considering the question of speeds of the belt and the broadcasting unit, it may be unnecessary to vary the belt speed in relation to the constant speed of the motor means of the broadcasting unit. It has been further found that as an operator becomes experienced in working with the spreader, it is not difficult to relatively quickly set the speed of travel of the prime mover to accomplish a sufficiently constant application of the material being spread, knowing the setting of the outlet means of the hopper. Nevertheless, should it be desired to more closely relate the broadcasting rate to the speed of the apparatus over the ground, it would be possible to incorporate into the control unit 43 an electronic control component (not shown) for varying the setting of the proportioning valve which directs fluid through supply line 50 to the motor means 41 of the belt drive. Such an electronic control component could respond, for example, to pulses developed by a light reading means or by magnetic pulses activated on each rotation of one of the ground engaging wheels whereby the valve setting for controlling the belt speed relates directly to the rotational speed of a wheel and thus to the ground speed without any turning resistance being experienced by the wheel.

The hopper 30 of the apparatus 20, which is attached to the top of the chassis structure 21, is defined by opposed side walls 53,53. The two side walls are joined at front edges to opposite ends of a front wall 54 and at rear edges to opposite ends of a rear wall 55. Upper edges of all four walls 53,53, 54 and 55 are disposed in a common horizontal plane which defines the open top of the hopper and through which material may be dumped, for example, by a front end loader. All of the walls converge in a downward direction to an open bottom of the hopper, and bottom edges of the two side walls 53,53 and the front wall 54 are in a common plane disposed immediately above a top surface of the upper flight 34 of the continuous belt 33.

Figure 4:
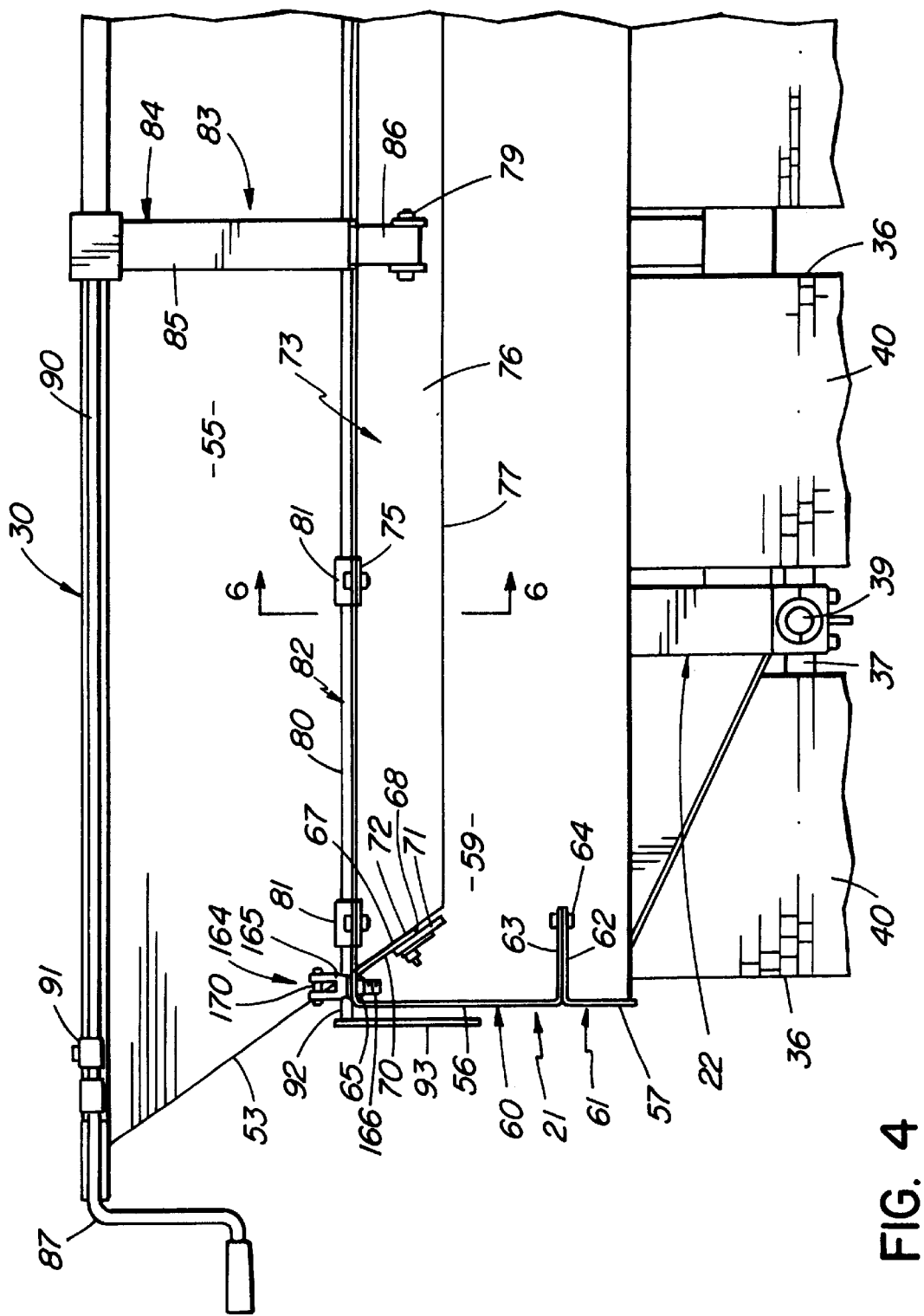
FIG. 4 is an enlarged view from the rear of the apparatus but showing only a right hand portion of the apparatus and with the broadcasting unit and the belt cartridge removed.

Referring to FIGS. 1 and 4, it may be seen that the chassis structure 21 includes a main upper side panel 56 of rectangular shape provided by a formed sheet metal member 60 and a lower side panel 57 provided by a formed sheet metal member 61. At the top of the panel 57, the sheet metal member 61 is bent to provide an inwardly projecting, horizontal flange portion 62, and at the bottom of panel 56, the sheet metal member 60 is bent to provide an inwardly projecting, horizontal flange portion 63. The sheet metal members 60 and 61 are fastened together with the panels 56 and 57 in the same vertical plane by way of fasteners, such as nuts and bolts 64 passing through engaged flange portions 62 and 63. The opposite side structure of the chassis structure 21 is of identical configuration and of a mirror image to that shown in FIG. 4. At the upper edge of the panel 56, the sheet metal member 60 is bent inwardly to form a narrow top portion 65 of the chassis structure 21, thus providing a top surface 66 along either side of the chassis structure. The sheet metal member 61 is then bent downwardly at an angle to form an inwardly and downwardly inclined flange 67 which, as best seen in FIG. 4 corresponds to the incline of the side walls 53,53 of the hopper 30. The inwardly inclined flange 67 has a lower edge 68 which is spaced above the top surface of the upper flight 34 of the continuous belt when the belt cartridge 32 is installed, as is more apparent from FIG. 5. Fastened by way of bolts and nuts 72 to an outer surface 70 of the inclined flange 67 is an elongated strip, such as one formed of rubber material the strip having a lower edge projecting well below the lower edge 68 of the inclined flange 67 so as to form a flexible skirt 71 which engages the upper flight 33 of the continuous belt when the belt cartridge is installed. Thus, the inclined flange 67 and the flexible skirt 71 prevents the material carried on the upper flight 33 from flowing to the very outer edge of the continuous belt 33. The sheet metal members 60 and 61 forming the two sides of the chassis structure thus provide side walls of the apparatus between which the belt cartridge 32 is located as will be described in more detail below. The inclined flanges 67 of the opposed side walls define an open channel behind the hopper 30 and through which the material is carried to the open rear end of the chassis structure 21. Extending between front edges of the side panels 56 of the sheet metal members 60 at the opposite sides of the chassis structure is a front panel 59 of the bulkhead, thus closing off the forward end of the belt cartridge receiving space between the side panels.

Figure 6:
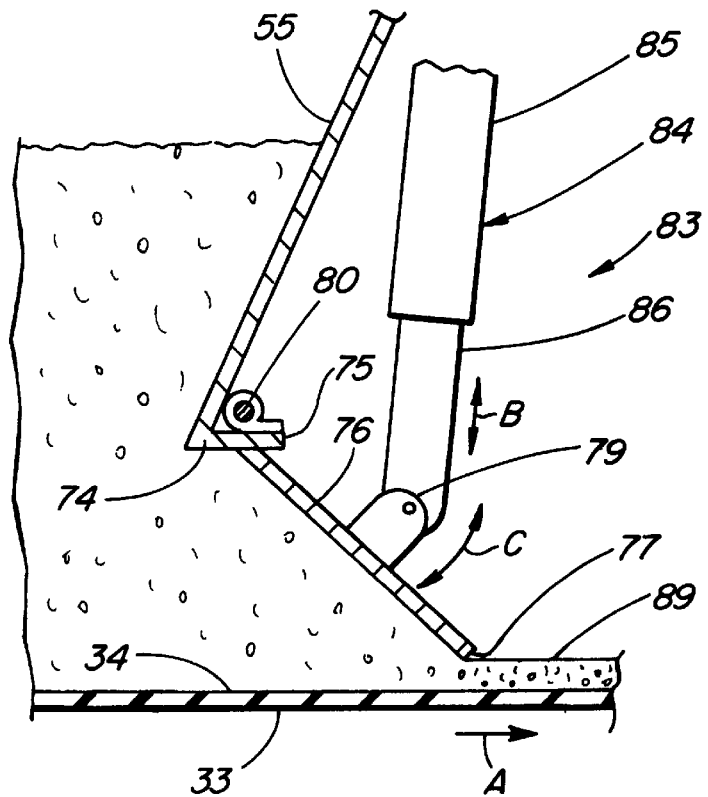
FIG. 6 is a cross-sectional view shown through a rear portion of a storage hopper of the apparatus and including a hopper outlet means as seen from the line 6—6 of FIG. 4, but further showing its relationship to a belt with the belt cartridge in place.

The rear wall 55 of the hopper 30 has the outlet means 73 located at a lower edge 74 thereof (FIG. 6). The lower edge 74 is at the same level as the top surfaces 66,66 of the sides of the chassis structure 21 so that the lower edge 74 is spaced well above the upper flight 34 of the continuous belt 33. Spaced along the lower edge 74 of the rear wall 55 are rearwardly projecting lugs 75. An adjustable gate 76 is part of the outlet means 73 and extends across the width of the chassis structure between the downwardly inclined flanges 67,67 of the side walls of the chassis structure. The opposite ends of the gate 76 are tapered inward from a top edge of the gate to its lower edge 77 so as to completely close the space below the lower edge 74 of the rear wall 75. A transversely extending rod 80 is integrally affixed to the upper edge of the gate 76 and is held on top of lugs 55 by clamp pieces 81 so that the rod 80 can rotate relative to the lugs 75 and thereby provide a hinge connection 82 between the upper edge of the gate 76 and the lower edge 74 of the rear wall 55. As the material is withdrawn from the hopper by travel of the belt 33 in the direction of arrow A, the lower edge 77 ensures a precise shearing of the material and thus an even layer 89 of material being delivered to the rear of the chassis structure (FIGS. 6).

A gate adjustment means 83 is provided for establishing setting of the outlet means 73 of the hopper 30. The gate adjustment means 83 includes a selectively extendible means 84, which may be in the form of a simple screw jack having a base and housing portion 85 and an extendible rod 86 received in the portion 85. An upper end of the base and housing portion 85 is pivotally connected by a bracket 88 (FIG. 1) to the rear wall 55 well above the gate 76, and a lower end of the extendible rod 86 is connected to a rear surface of the gate 76 by a pivot connection 79. A crank handle 87 is readily accessible to an operator at the left hand side of the hopper 30 and is connected to and outer end 92 of a crank extension 90, which, at its other end is attached to a screw portion in the base and housing portion 84. The crank extension 90 is carried by the hopper for rotation in a mounting bracket 91. On rotation of crank handle 87 in one direction, the extendible means is shortened, i.e., extendible rod is pulled upwardly into the base and housing portion 85, while rotation of the crank handle 87 in the opposite direction extends the rod 86. Thus, as extendible rod 86 is retracted or extended, as indicated by arrow B in FIG. 6, the gate 76 which is hinged about the axis of rod 80, swings as indicated by arrow C, so as to selectively vary the amount of material which passes thereunder in the form of layer 89. One outer end of the rod 80, which is affixed to the gate 76, extends laterally outward of the side panel 56, and has fastened thereto at right angles to the longitudinal axes of the rod 80 an indicator member 93. Accordingly, when the gate 76 is raised or lowered, as indicated by the arrow C, the indicator member 93, which can be readily observed, is rotated with the gate, thus giving a visual indication as to the setting of the gate 76.

Figure 7:
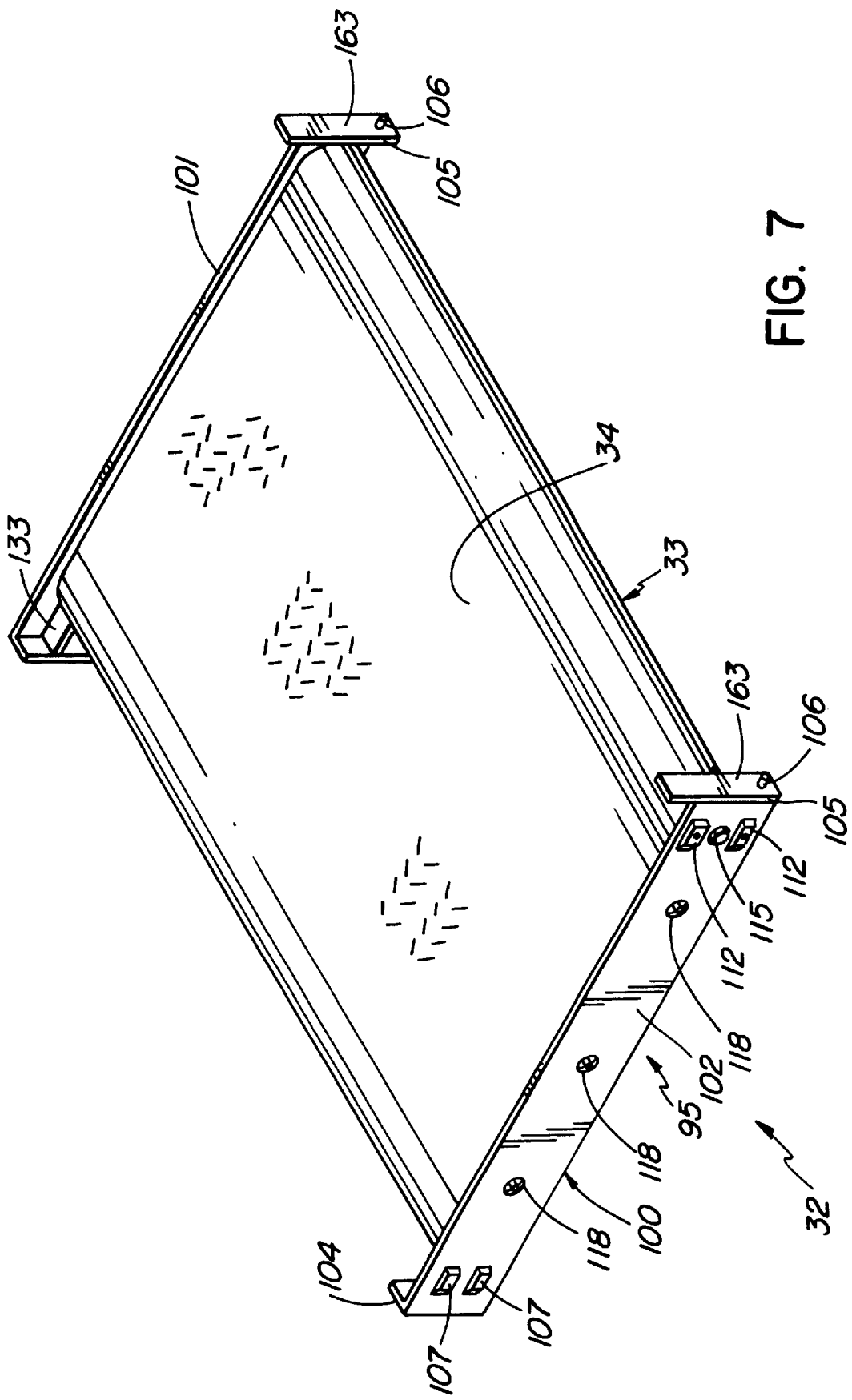
FIG. 7 is a perspective view as seen from a rear/left hand portion of the complete belt cartridge.
Figure 8:
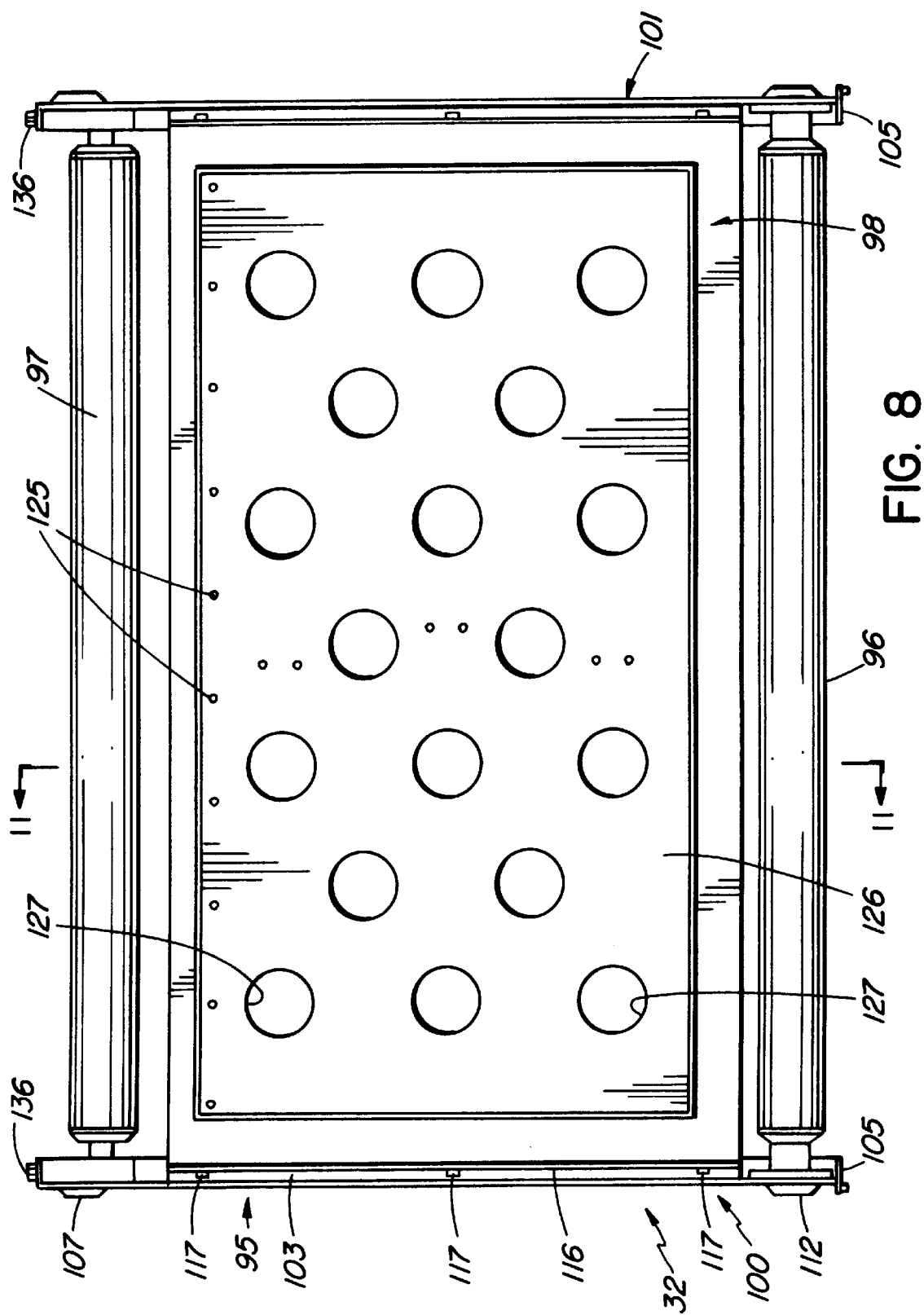
FIG. 8 is a plan view of the belt cartridge of FIG. 7, but with the continuous belt removed for the sake of clarity in illustrating the supporting framework and rollers of the belt cartridge.
Figure 9:
FIG. 9 is a rear view of the belt cartridge as shown in FIG. 8, but on an enlarged scale.

Referring now to FIGS. 7 to 13 which illustrate belt cartridge 32, which is readily insertable and removable from the chassis structure 21, as will become more understandable from the following description, it may be noted that FIG. 7 shows the complete belt cartridge in a removed condition. The continuous belt 33 which has the upper flight 34 extending substantially the fill length of the belt cartridge, is provided with a plurality of ribs 94, which may be in the form of various patterns, but should extend at least partially in a transverse direction so as to drag the material to be distributed from a pile of the material contained in the hopper 30, as the upper flight 34 is driven in a direction from front to rear of the apparatus 20.

Figure 5:
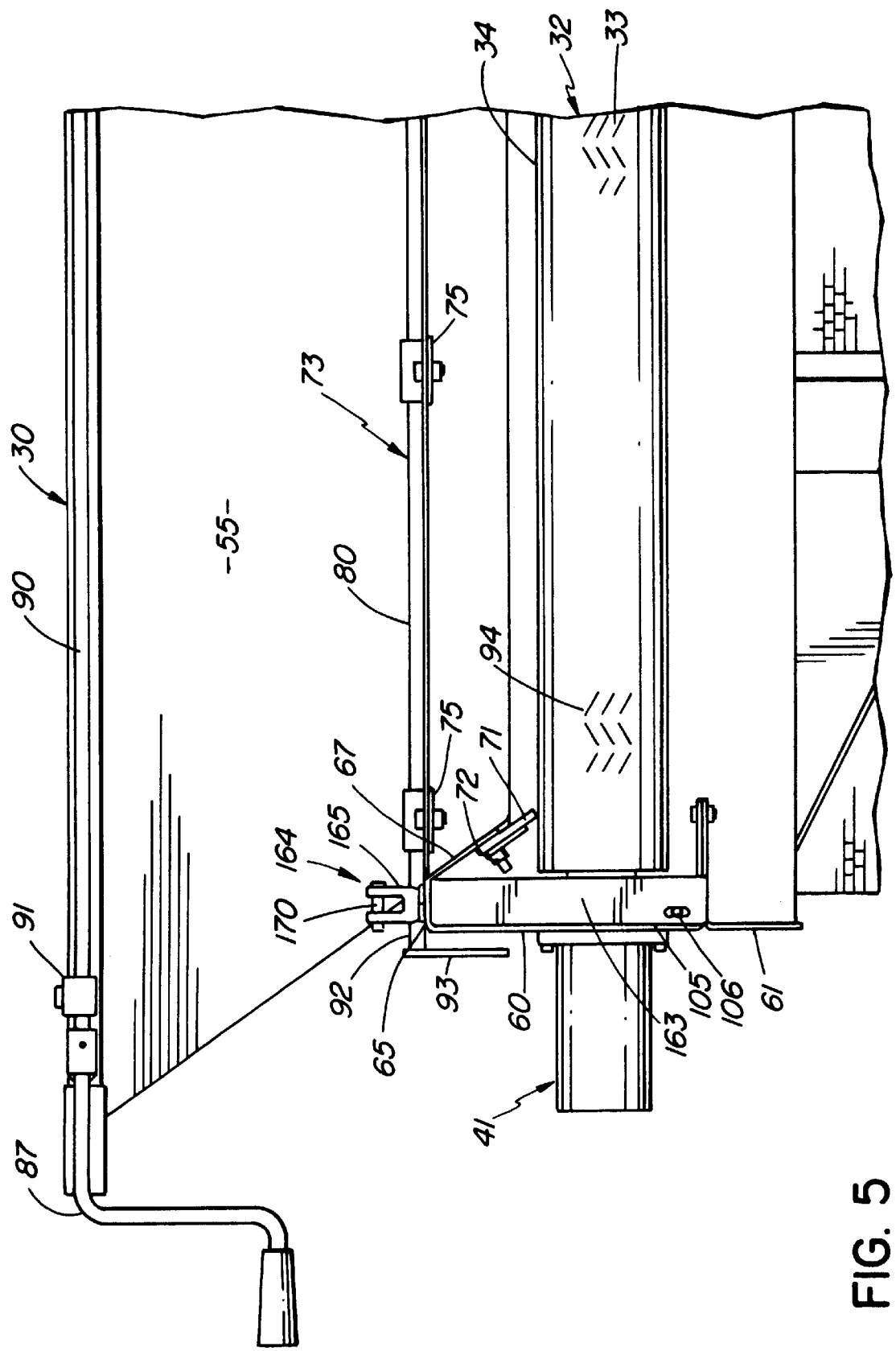
FIG. 5 is a view similar to FIG. 4, but with the belt cartridge in place and on a larger scale.
Figure 10:
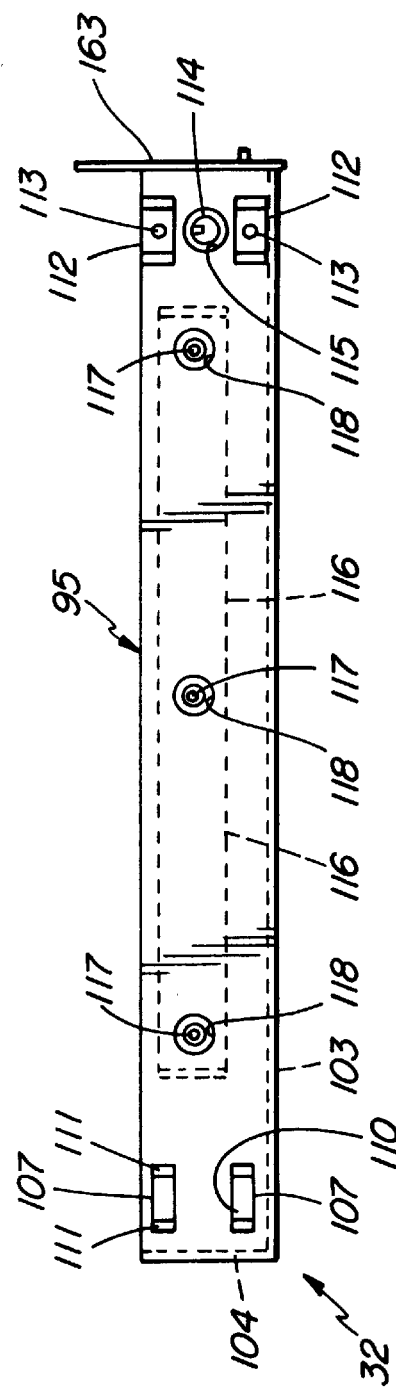
FIG. 10 is an elevational view of the belt cartridge of FIG. 8, as seen from the left side and on an enlarged scale.

The belt cartridge 32 includes a framework 95 having side rails 100 and 101 which carry therebetween a drive roller 96 at the rear, a belt tensioning roller 97 at the front and a connecting table structure 98 positioned between the rollers for supporting the upper flight 34. As best seen in FIG. 10, the side rail 100 is an elongated sheet steel member of generally L-shaped configuration having a vertical web portion 102 and an inturned horizontal bottom flange 103. At the forward end of the side rail 100 there is an inturned end flange 104, and affixed to the rear end of the side rail is an abutment plate 105 disposed in a plane normal to the longitudinal axis of the side rail 100. The vertical length of the abutment plate 105 is greater than the height of the side rail 100, and it extends slightly below the bottom surface of the flange 103 of the side rail. It is also of a sufficient height to extend well above the top edge of side rail 100 so that an upper edge of the abutment plate substantially coincides with the level of the top portion 65 of the sheet metal member 60 of the chassis structure when the belt cartridge 32 is installed as illustrated in FIG. 5. Adjacent a lower part of the abutment plate 105, a rearward projecting post 106 is affixed to a flat rear surface 163 of the abutment plate 105. Adjacent the front of the end of the vertical web portion 102 of the side rail 100 there are a pair of projections providing slide block 107,107 having flat outer surfaces 110 disposed in a plane parallel to the rail 100 and tapered end portions 111. Similarly shaped side projections 112 are provided adjacent the rear end of the side rail 100, but the projections 112 are provided with threading bores 113 for receiving mounting bolts of the motor means 41. Between the vertical spaced projections 112 the vertical web of the rail is provided with an opening 115 through which a drive shaft 114 of the drive roller 96 projects.

Secured to an inner surface of the vertical web portion 102 of the rail, but spaced slightly inward therefrom is an elongated mounting plate 116. The mounting plate 116, which is in parallel relationship to the web portion 102 has a plurality of holes along its length for receiving fastening bolts 117. The web portion 102 has a plurality of holes which form bolt access openings 118 through the web portion, the access openings being aligned with the bolt receiving holes 117 in the mounting plate 16. The side rail 101 is a mirror image of the structure of side rail 100 except the side projections corresponding to projection 112 of the side rail 100 are not provided with threaded bores and there is no opening corresponding to opening 115 of the side rail 100.

The table structure 98, which is bolted between side rails 100 and 101, includes a flat, sheet metal, horizontal, top plate portion 120 with downwardly depending front flange 121 and rear flange 122. At opposite sides of the top plate portion 120 there are provided downwardly depended side flanges 123 (FIG. 11) which are provided with threaded openings 124 for alignment with the holes of the mounting plate 116 so that bolts 117 extending through the holes of the mounting plate 116 can be threaded into the threaded openings 124 thereby supporting the table structure 98 between the mounting plates 116 of the side rails 100 and 101. Affixed to a top surface of the top plate portion 120 of table structure 98, such as by rivets 125 (FIG. 8) is a cover plate 126 which is of substantially the width of continuous belt 33 but is of less width than the top plate portion 120. The cover plate 126, across which the upper flight 34 of the continuous belt 33 is drawn, is preferably formed of a high wear resistant material having a surface providing a low coefficient of friction, such as a polyethylene plastic of the ultra high molecular weight type. The cover plate 126 is formed with a plurality of large circular openings, as shown at 127, extending therethrough. The openings 127 compensate for the different expansions experienced by the plastic material and the steel in the top plate portion 120 due to a temperature rise during operation. Moreover, such openings have been found to reduce the drag of the upper flight over the cover plate.

Figure 12:
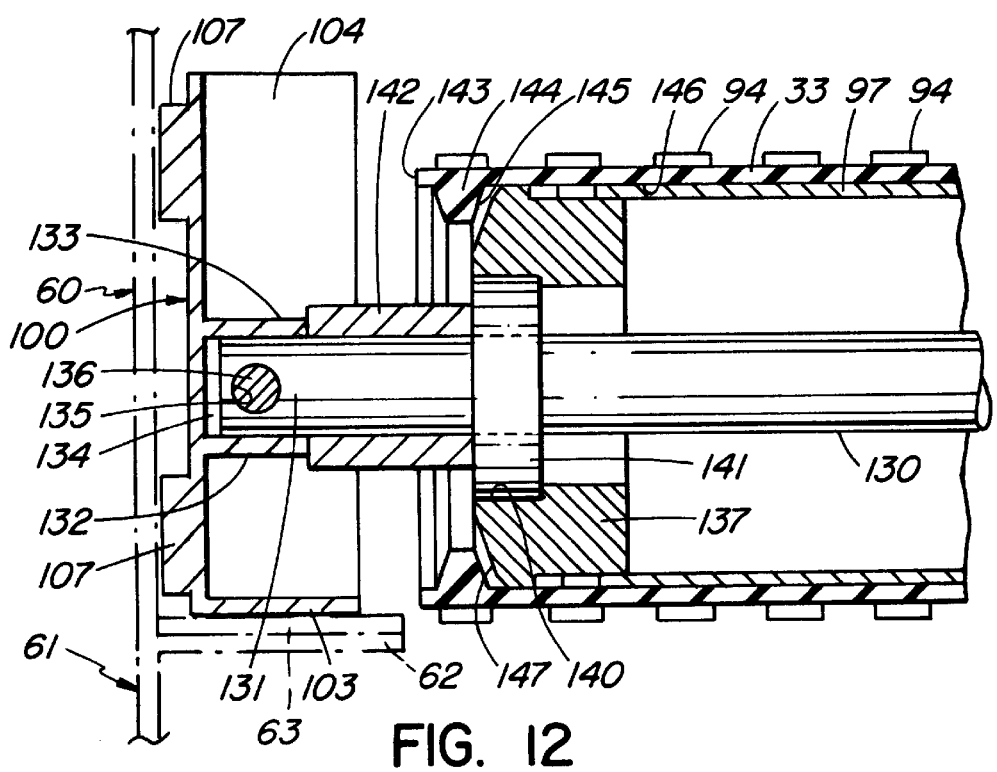
FIG. 12 is a cross-sectional view as seen from the line 12—12 of FIG. 8, again with the continuous belt in place and also illustrating the relative position of the cartridge within the front left corner of the chassis structure of the apparatus.
Figure 11:
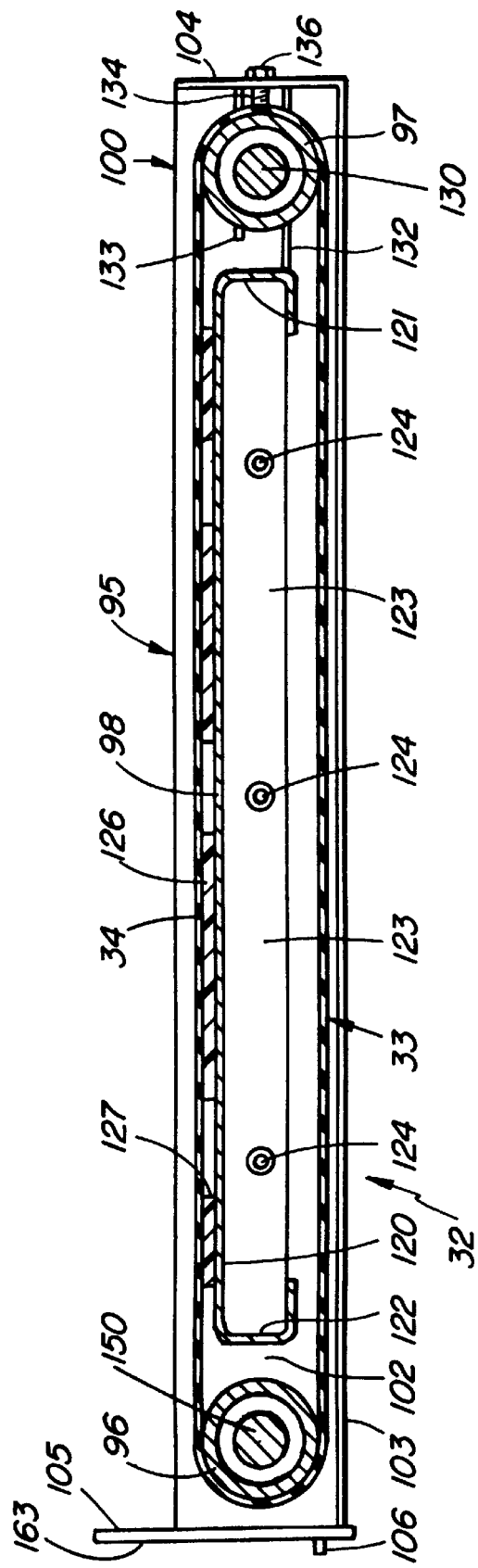
FIG. 11 is a cross-sectional view as seen from the line 11—11 of FIG. 8, but with the continuous belt in place.

The tensioning roller 97 is mounted for rotation on a stationary shaft 130 extending between side rails 100 and 101 forward of the front flange 121 of the table structure 98 (FIGS. 11 & 12). Each end portion 131 of the shaft 130 is received between a lower horizontal rib 132 and an upper horizontal rib 133 which are both formed integrally with an inner surface of the side rail 100, 101 and thereby form a horizontal channel 134 extending in the longitudinal direction of the rail. A threaded opening 135 is provided through each end portion 131 of the shaft 130 and receives a bolt 136 which passes through a bore in inturned end flange 104 at the forward end of the associated side rail 100,101. Thus, when installing or adjusting the tension on the continuous belt 33, the bolts 136 can be turned from the front end of the belt cartridge to allow the end portion of the shaft to move in the channels 134 of each side rail towards the rear of the cartridge or alternatively, to be pulled forward.

To allow tensioning roller 97 to turn freely on shaft 130 there is affixed internally of either end of the roller 97 a hub 137 which has a central bore defining a bearing seat 140. A bearing 141 is thus installed between the hub 137 and the shaft 130 (FIG. 12). A spacer sleeve 142 is provided between an inner bearing race of the bearing 141 and the ribs 132 and 133 to maintain the roller 97 in a centered position between the side rails 100,101.

While the continuous belt 30 is formed of general flat material having the raised ribs 94 on the outer surface, there are vulcanized on the flat inner surface 146 thereof adjacent each side edge 143 of the continuous belt, an internal ridge 144, an inner side surface 145 facing an outer end surface 147 of the hub 137. The inner side surface 145 slants outwardly toward the inner flat surface 146 of the belt and in a direction towards the outer end of the hub. The outer end surface 147 of the hub extends to the circumference of the roller, the end surface 147 tapering outwardly and toward the end of the roller 97 so as to approximately coincide with the taper of the adjacent inner side surface of the ridge. The inner side surface 145 of the ridge thus provides an abutment surface inwardly of the inner surface 146 of the continuous belt for engagement with an abutment surface provided by end surface 147 at the end of the roller so that in the event the continuous belt 33 tracks slightly sideways, i.e., the adjacent edge 143 approaches the end of the roller, the abutment surfaces engage to limit the sideways tracking of the belt. By providing such a ridge on the inner surface of the belt adjacent each side edge of the belt with a coinciding taper of the adjacent end hub of the roller, the belt tends to self track, making the requirement of finer adjustments of the bolts 136 during tensioning of the belt less critical.

Figure 13:
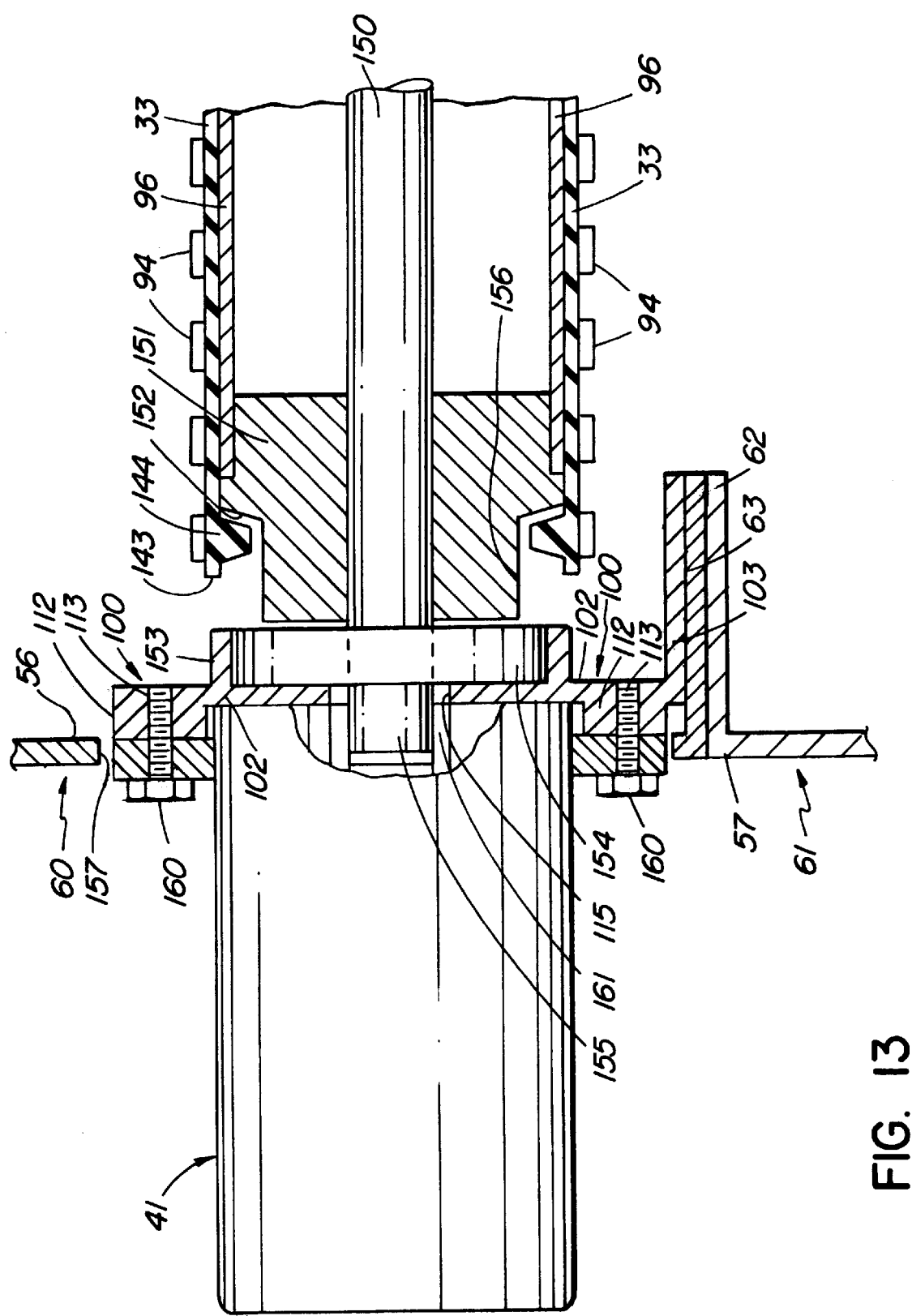
FIG. 13 is a cross-sectional as viewed from line 13—13 of FIG. 1 and on an enlarged scale, and showing a portion of the belt cartridge in relation to the drive motor as mounted in the chassis structure.

The drive roller 96 is mounted on a shaft 150 jouralled for rotation relative to side rails 100,101. As shown in FIG. 13, a roller hub 151 is provided at each end of the roller 96 and is secured to both the roller 96 and the shaft 150 so that the shaft 150 and roller 96 rotate as a unit. The hub 151 provides an outer end surface 152 of the same shape as the outer end surface 147 of the hub 137 in the tensioning roller so as to enhance the self-tracking feature of the continuous belt 33. Surrounding the opening 115 of rail 100 on the inside of its vertical web portion 102 of rail 100 is a bearing retaining flange 153 which contains bearing a 154 thus allowing rotation of the outer end 155 of the shaft 150. Hub 151 includes an outer end portion 156 of smaller diameter which is adapted to engage an inner race of the bearing 154 so as to control the end play of the roller 96. The outer end 155 of the shaft 150, extends through the opening 115 of the rail and an opening 157 in the side panel 56 of the sheet metal member 60 forming the chassis structure 21. The motor means 41, which is preferably in the form of a hydrostatic motor, is provided with a pair of opposed attachment flanges having openings therethrough for alignment with threaded openings 113,113 of slide blocks 112,112 formed on the web 102 of the side rail 100. The motor means 41 is thereby attached to the side rail 100 by way of bolts which pass through the holes in the attachment flanges of the motor means and are threaded into opening 113,113. The outer end 155 of the shaft 150 projects into a bore of a rotor of the motor means sized to receive the shaft 150. The shaft 150 and the rotor are provided with keyways so as to be drivingly connected together.

Looking at FIGS. 4, 5 and 7, it can be seen that by two people grasping opposite sides of the free belt cartridge 32, it can be readily lifted and inserted into the rear of the chassis structure 21. The front end is first raised and moved forward until the forward end of the side rails 100,101 rest on the ledge provided on either side by flanges 62,63, i.e., with the bottom surfaces of the bottom flanges 103 of the side rail 100 and 101 resting on the upper surface of flange 63. In this position the side blocks 107,107 at the front of each side rail are in close proximity to the interior surface of the side panel 56 of the chassis structure and thus permit substantially no side movement of the belt cartridge. From this initial inserting position the interior belt cartridge 32 can be easily pushed to its forward-most position where the front ends of the rails are brought against the front panel 59 of the bulkhead, and at which time the front surfaces of the plates 105,105 are juxtaposed the rear edges of the sheet metal members 60,61 forming the side panels 56,57, the ledge provided by the flanges 62,63 and the inturned upper portion of the sheet metal members. At this point the motor means 41 can be attached to the belt cartridge through opening 157 in the side panel 56 by way of bolts 160,160. During operation, the reactionary force to the top flight 34 of the continuous belt 33 dragging the material from beneath a pile of the material in the hopper, results in a continuous push of the belt cartridge to its normal forward most position.

When servicing of the belt cartridge 32 is needed, it is only necessary to remove the motor means 41 from the belt cartridge, and to then pull the belt cartridge to the rear and set it in an accessible position. The belt tensioning can be readily adjusted by turning bolts 136,136. To clean the interior of the belt cartridge and/or replace parts, such as the bearings 141 and 154, cover plate 126 and/or the continuous belt itself, the entire unit can be completely disassembled by reducing the tension by turning bolts 136,136, removing the three bolts 117, which can be readily turned out through belt access opening 118 in the web 102 of the side rail 100 or 101. Once either of the side rails is removed, the continuous belt 33 can be slid sideways from the rollers 96,97 and all of the other parts separated as required.

Figure 14:
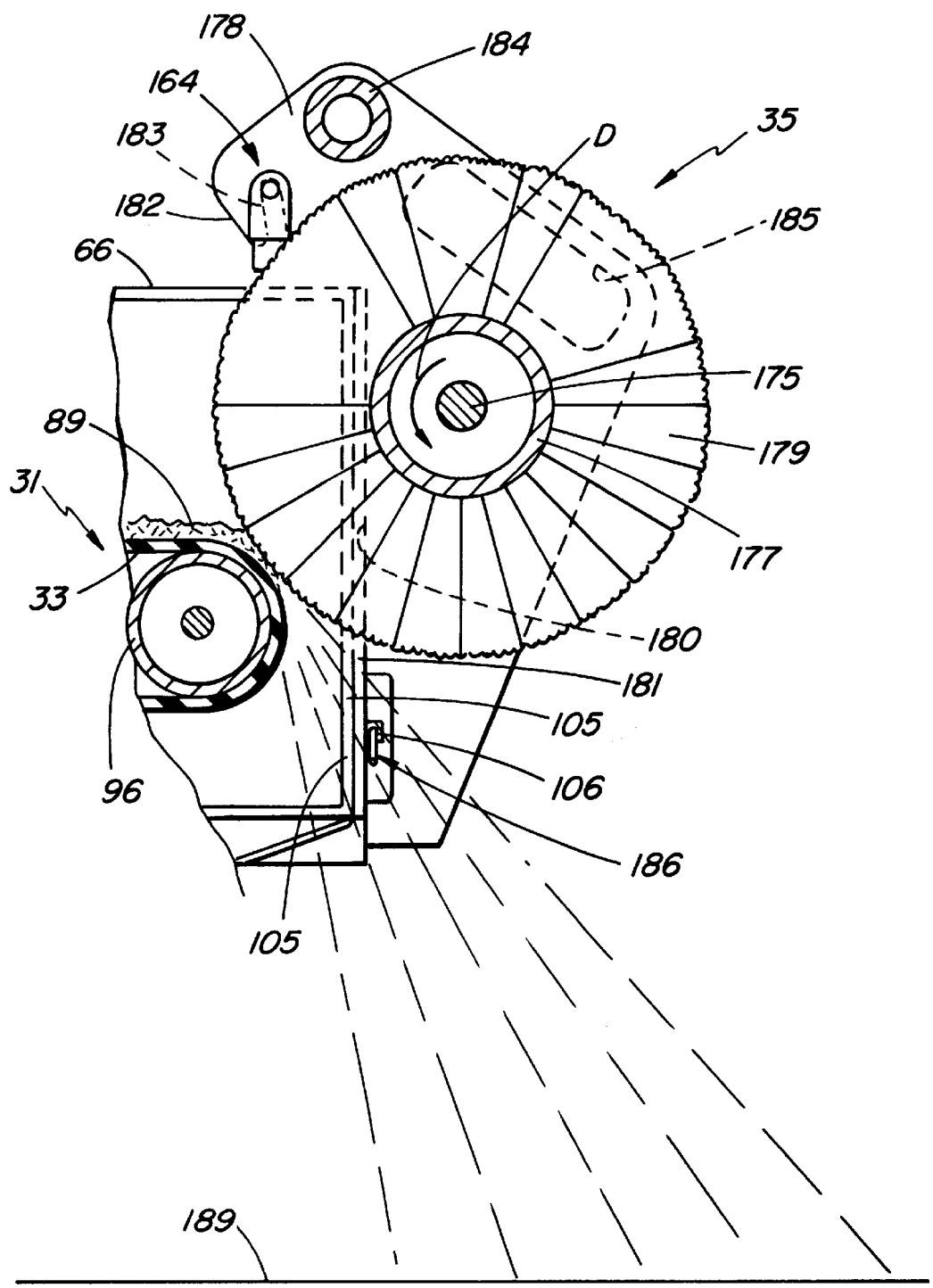
FIG. 14 is an enlarged cross-sectional view as seen from the line 14—14 of FIG. 2 and showing the relationship of one form of a rotating brush device with the belt cartridge during operation and mounted in accordance with the attachment system of the present invention.

The material broadcasting unit 35 in the apparatus 20 as illustrated in FIGS. 1 to 3 is further shown in FIG. 14, and in the latter figure its manner of operation in relation to broadcasting material received from continuous belt 33 is not unlike the operation of brush devices provided on known top dressers. However, the brush device appearing as the material broadcasting unit 35 is provided with a framework 162 which allows for quick substituting for other units described below due to a particular attachment system involving features of the chassis structure 21 and belt cartridge 32 as well. As previously described, the belt cartridge 32 provides abutment plates 105,105 at the rear ends of side rails 100,101, and when the belt cartridge 32 is in the installed position, these abutment plates have rear surfaces 163,163 thereof in a common vertical transverse plane at the very rear of the chassis structure 21 as defined by formed sheet metal members 60 and 61. The posts 106 of each side rail project rearwardly from the rear surfaces 163,163.

Figure 16:
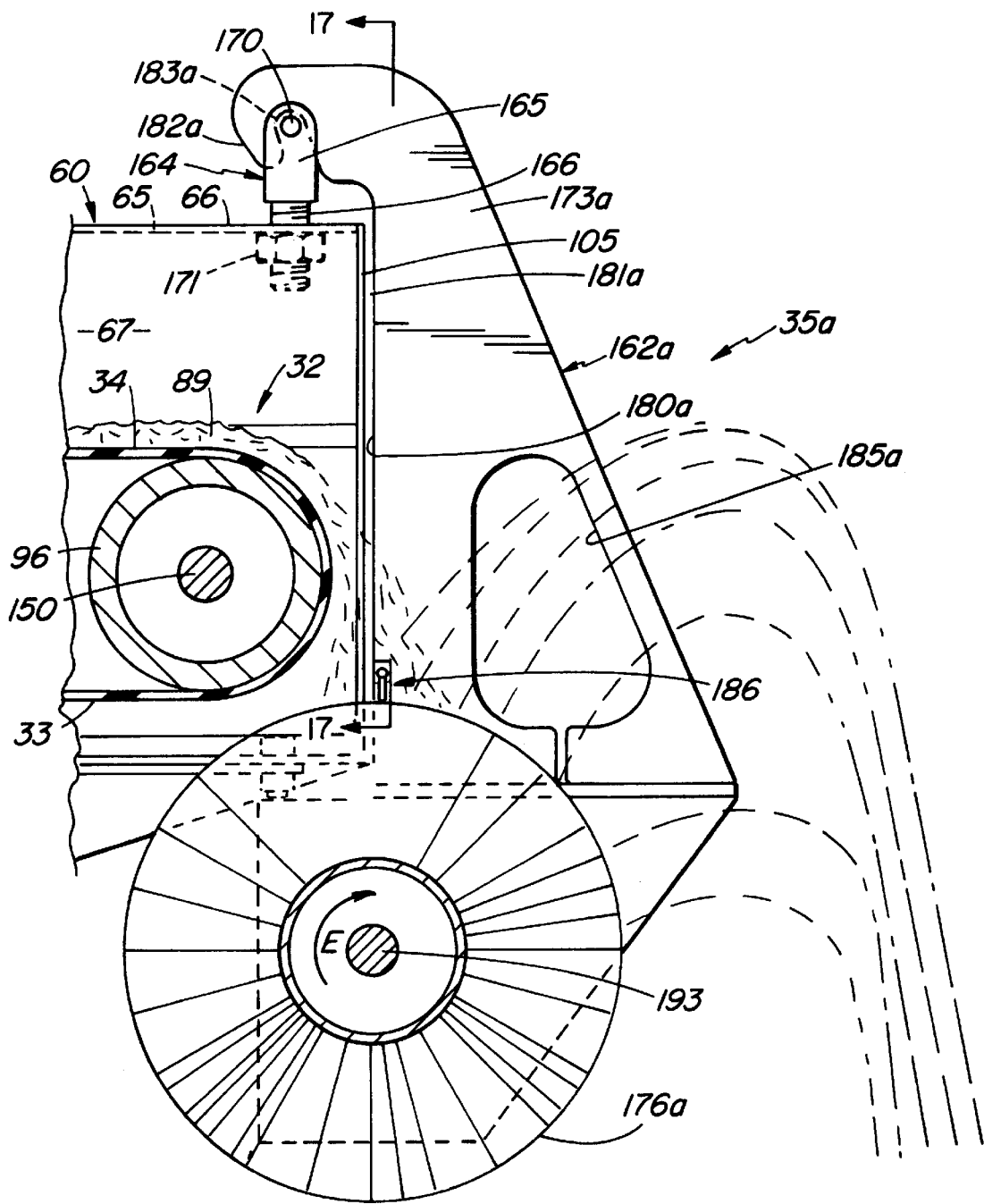
FIG. 16 is an enlarged cross-sectional view as seen from the line 16—16 of FIG. 15 and showing the relationship of the rotating brush device of FIG. 15 with the belt cartridge during operation.

The attachment system of the present invention includes an attachment component 164 mounted on top of the chassis structure 21 at either side of the very rear of the chassis structure 21 as is readily apparent in FIGS. 4 and 16. The attachment component 164 has an upper portion above the top surface 66 defined by the top portion 65 of the formed sheet metal member 60, the upper portion of the component 164 being a U-shaped clevis portion 165 formed integrally with a downwardly projecting threaded shank 166. Upwardly extending lugs 167,167 forming each clevis portion 165 have aligned transverse bores 168,168 therethrough and receive a cross pin 170 thereby providing a transversely extending member. The top portion 65 of each sheet metal member 60 has an opening through which the shank 166 of one of the components 164 extends, there being affixed to the lower surface of the top portion 65 a threaded nut portion 171 into which the shank portion 166 is screwed. It can be seen by simply turning the clevis so that it threads into or out of the nut portion 171, the height of the cross pin above the top side surface 66 can be adjusted.

The framework 162 of the brush device forming broadcasting unit 35, includes a pair of side members 172 and 173 which may be made of flat metal plates having bearing means 174 for rotatably mounting a shaft 175 of a rotatable brush 176 at opposite ends thereof One end of the shaft 175 is drivingly connected to the motor means 42 externally of the side member 172. The rotatable brush 176 has a cylindrical core member 177 which is affixed to shaft 175 so as to be rotated in the direction of arrow D in FIG. 14. The rotatable brush has multiple radially projecting bristles 179 affixed to the cylindrical core member 177, and the outer ends of the bristles form a generally cylindrical outer surface of the brush having a length substantially equal to the width of the continuous belt 33.

Other than for the opening provided in side member 173 of the framework 162, the metal plates forming the side members 172 and 173 may be of the same general configuration. A top edge of each plate member forming the side members 172,173 extends upwardly from the rear-most part of the side member to the highest portion of the side member and then slopes downwardly to the forward-most part of the side member. Below the highest portion of the side member, and rear of forward-most portion 178, the side member has vertical front edge 180 extending substantially to the bottom of the side member. Affixed to the front edge 180 of each side member 172 and 173 in front of the main body portion of the unit is an abutment plate 181, the front faces of the two abutment plates being a common vertical transverse plane. An upwardly extending slot 183 which curves slightly forward is provided in a lower edge 182 in the portion of each of the side members 172,173, which edge extends rearwardly under the forward-most portion of the side members 172,173. To strengthen the overall brush device there is provided a cross bar 184 which is connected between the upper-most portion of the side members 172,173. Located immediately below the upwardly slanting top edge of each side member 172,173 is an elongated opening 185 which provides a hand-hold at each end of the device.

The upper end of slot 183 is forward of the front faces of the abutment plates 181 a horizontal distance equal to the distance between the rear faces 163 of the abutment plates 105 of the belt cartridge when carried in place by the chassis structure 21. Accordingly, to install the broadcasting unit 35, it is lifted from opposite ends so as to hold the upper portion of the unit slightly forward when placing the hook-shaped, upper forward portions of the side members over the cross pins 170 of the attachment component 164 above the top side surfaces 66 of the chassis structure 21. As it is lowered into place and released, the abutment plates 181,181 of the unit 35 swing into full contact with the vertically disposed abutment plates 105,105 carried at the rear of the chassis structure 21. As the center of gravity of the overall unit 35 passes through the main body portion of the unit, it is well behind the upper end of the slot 183, and thus, the unit 35 hangs naturally in its proper position with the abutment plates 181,181 engaging the abutment plates 105,105.

It is apparent that while the above described quick attachment system illustrates a transversely extending member in the form of the cross pin 170 being carried by clevis portion 165 mounted on the side walls of the chassis and a downwardly open hook portion provided on the side members 172,173 of the broadcasting unit, other types of interlocking attachment components would provide the same lift-on, lift-off connection between the unit and the chassis structure. The important aspect of the connection is that the broadcasting unit can be hand lifted to a position with the forward most portions of the side members connecting together with a component carried by the chassis as the unit is slightly lowered and allowed to swing into engagement with the rear of the chassis structure. One equivalent alternative, for example, would be that of providing a cross pin or the like on the side members which would move into a component carried by the side walls of the chassis and which component defines a downwardly extending slot for reception of the cross pin.

As seen from FIG. 14, the effective outer cylindrical surface of the brush formed by the outer ends of the bristles passes in close proximity to the surface of the continuous belt 33 at the point where the continuous belt commences to round the drive roller 96 at the very rear-most of the conveyor means 31. In fact, the outer ends of the bristles 179 may slightly brush the outer surface of the continuous belt 33 at this point on rotation of the brush. Thus, as the layer 89 of material approaches the rear end of the upper flight 34 and starts to drop off, it is engaged by the bristles 179 and propelled downwardly and slightly rearward so as to strike turf 189 over which the apparatus 20 is passing. With the type of brush device described to this point the apparatus 20 spreads the material evenly over a track which is approximately the width of the continuous belt 33. Depending on the type of material being broadcast or its condition, it may be desirable to adjust the position of the periphery of the rotatable brush 176 relative to the rear portion of the continuous belt 33. Alternatively, after a period of use of the brush device, the bristles may become sufficiently worn that it becomes desirable to lower the rotatable brush 176. Adjustment of the position of the brush can be readily accomplished by rotating the attachment component 164 with the side members 172 and 173 of the unit 35 raised to clear the cross pin 170. Turning the clevis portion 165 in a direction to screw the shank into the threaded nut portion 171 lowers the cross pin 170, of course, so that when the side members 172, 173 are replaced, the rotatable brush 176 is suspended at a lower position.

Figure 15:
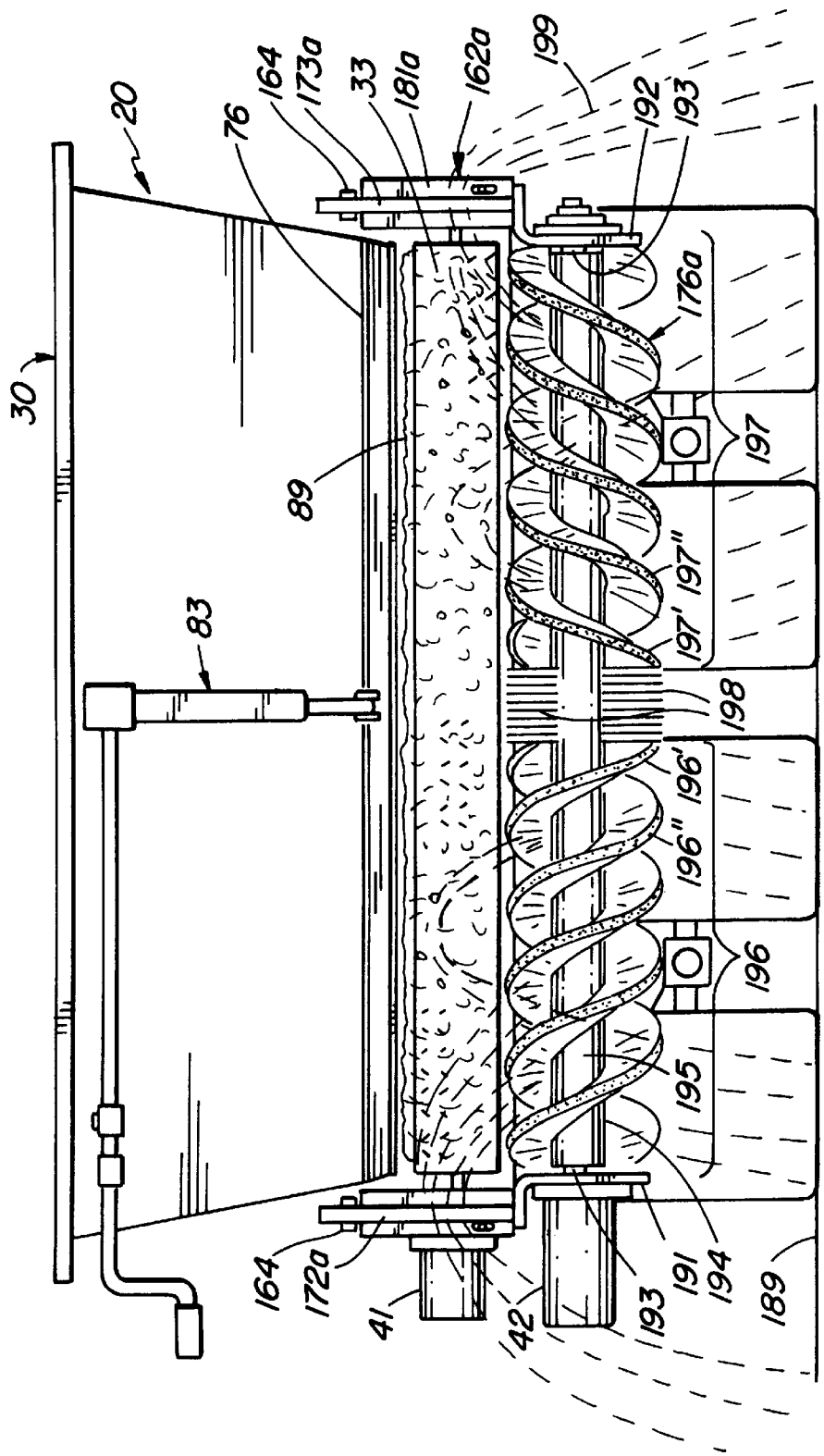
FIG. 15 is a rear view of the apparatus of the present invention but showing the attachment of another form of a rotating brush device according to the present invention.

Turning now to the brush device shown as broadcasting unit 35a in FIGS. 15 and 16, it may first be seen that it has a framework 162a shaped somewhat different than described for broadcasting unit 35 above, but with respect to the parts thereof which cooperate with the attachment system of the chassis 21 and the belt cartridge 32 carried thereby, it has substantially identical characteristics. The rotatable member, hereinafter referred to as a rotatable brush 176a of the broadcasting unit 35a is located lower than the rear end of the belt cartridge 32, i.e., the rotatable brush is located under the drop-off end of the continuous belt 33. As indicated by arrow E in FIG. 16, the rotatable brush 176a is rotated in the opposite direction so that the material from layer 89 falls from the upper flight 34 as the continuous belt 33 rounds the drive roll 96, and the falling material, as it is struck by bristles at the upper periphery of the rotating brush, it is propelled rearwardly of the brush and somewhat upwardly as indicated in FIG. 16.

The framework again includes two parallel side members 172a and 173a with the rotatable brush 176, driven by motor means 41, mounted therebetween. Because the roller is mounted considerably lower relative to the remainder of the apparatus than in the case of broadcasting unit 35, the side members 172a, 173a have greater depth. The side members 172a, 173a have however, an upper-most portion which extends forwardly of a front vertical edge 180a and provide a lower edge 182a extending rearwardly from the forward portion and including an upwardly extending slot 183a. As indicated by dashed lines in FIG. 16, the upwardly extending slot 183a preferably curves forward slightly for reasons described in more detail below. Affixed to the front vertical edge 180a of each side member 180a is an abutment plate 181 a, front faces of the abutment plates of the two side members 172a, 173a being in a common transversely extending, vertical plane. As shown the rear edge of the side members 172a, 173a slants downwardly and rearwardly and at the wider lower portion of each side members there is provided a hand-hold opening 185a.

Figure 17:
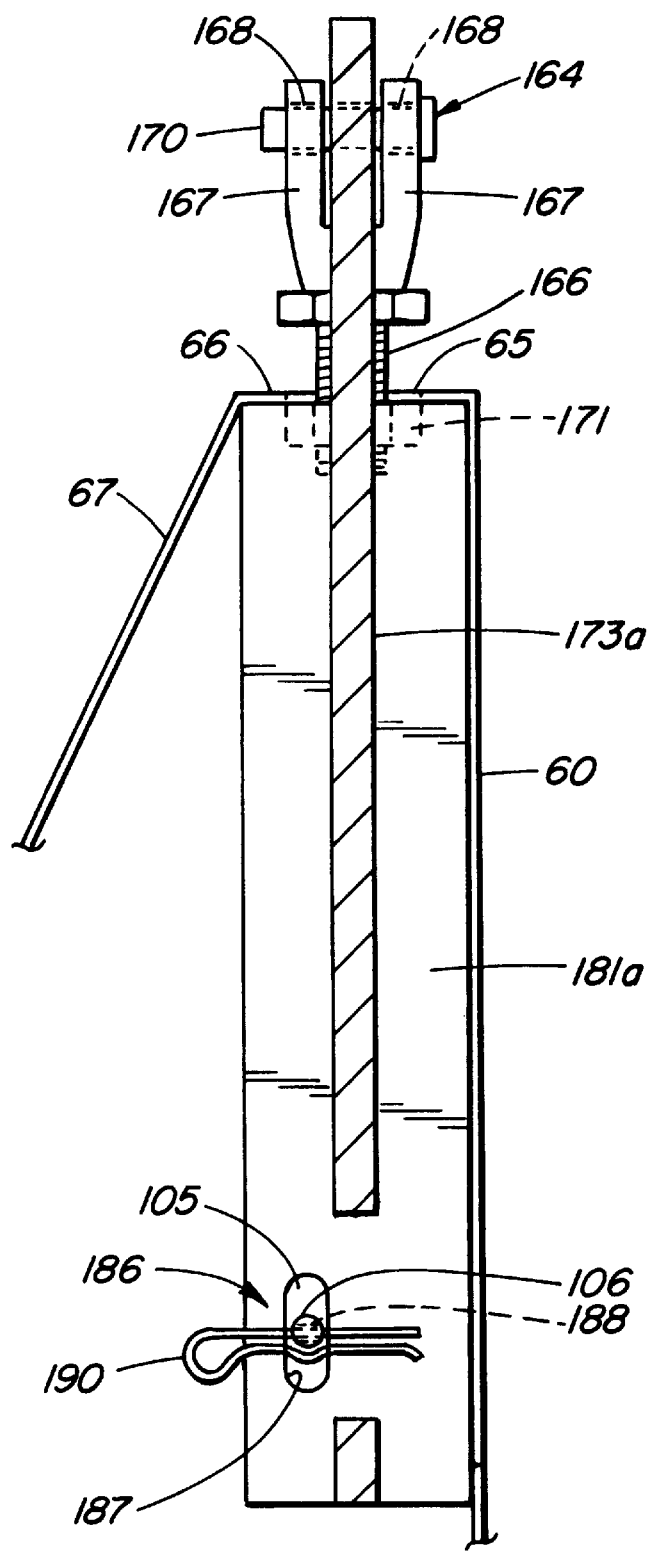
FIG. 17 is a cross-sectional view as seen from the line 17—17 of FIG. 16, illustrating a feature of the attachment system of the present invention.

As in the design of broadcasting unit 35 described above, the center of gravity of the broadcasting unit 35a is rear of cross pin 170 when the broadcasting unit 35a is suspended by the top of the slot 183a resting on the cross pin 170. When installing the broadcasting unit 35a, the unit is held with the upper-most portion slanting somewhat forward to hook the slot over the cross pin 170, and the main lower portion of the unit is swung down so that front surface of the abutment plates 181a, 181a engage rear surface 163, 163 of the abutment plates 105,105 exposed at the rear of the sides of chassis structure 21. The broadcasting unit is urged into its seating position due to its center of gravity being rear of the contact of the upper most part of the side members 172a, 173a with the cross pin 170. Because of the slight forward curvature of the slot straight, upward movement of the unit is resisted by engagement of the forward edge of the slot below the cross pin. The post 106, which is affixed to the rear abutment plate 105 carried by the belt cartridge, projects rearwardly of the rear surface 163 of the abutment plate 105 and provides a safety lock 186 permitting limited vertical movement of the broadcasting unit 35a while preventing the pair of abutment plates 18 la from swinging rearwardly out of contact with the pair of abutment plates 105. As best seen in FIG. 17, each of the abutment plates 181a, 181 a of the framework 162a is provided with an elongated slot 187 which is positioned to allow post 106 to project therethrough when the abutment plates 181a, 181a come into engagement with the abutment plates 105,105. Near the rear end portion of the posts 106, there are provided transverse bores, each adapted to receive an easily insertable and removable clip pin 190. Once the broadcasting unit 35a is in place, the clip pin 190 is inserted through a transverse bore 188 in the post 106 on either side of the apparatus, whereby any significant jars encountered by the apparatus ensures the unit 35a cannot depart from the apparatus 20. On the other hand, due to the fact the slot 187 is elongated in the vertical direction, there is permitted limited vertical adjustment of the relative positions of the abutment plates 181a,181a and abutment plates 105,105 as would occur on adjustment of the locating of the cross pin 170 in the attachment component 164. It should also be recognized that all of the different forms of broadcasting units as described herein, or other alternative forms which may be developed for use with the quick attachment system of the present invention, may be provided with the above described safety lock 186.

As best seen from FIG. 15, the framework 162a includes sub-frame members 191 and 192, attached to and depending from side members 172a and 173a, respectively. These sub-frame members are provided with bearings in which shaft 193 of the rotatable brush 176a is journalled for rotation. One end of shaft 193 extending through sub-frame member 191 and is attached to the output of motor means 42 so as to be driven for rotation, the motor means 42 being attached to the sub-frame 191.

The structure of rotatable brush 176a is of a character significantly different from that of rotatable brush 176 described above, in that the bristles thereof are arranged in a specific pattern. The rotatable brush 176a is provided with a core member 194 affixed to shaft 193 for rotation therewith. The bristles are arranged with the bases of the bristles affixed to an outer surface 195 of the core member 194 along narrow paths or strips to form flights 196 and 197 of bristles which spiral around the core member 194. With the direction of rotation of the rotatable brush, as indicated at E in FIG. 16, the movement of the upper periphery of the imaginary cylindrical form containing the bristles is rearwardly so as to distribute the material slightly upwardly and rearwardly as previously described. Considering this direction of rotation of the rotatable brush 176a, the strips of bristles are spiraled in opposite directions from a mid-area of the rotating brush towards opposite ends thereof. Thus, on rotation the effect of the flights of bristles is to progress from the centre outwardly towards the opposite ends of the rotated brush 176a. Preferably the inner ends of the oppositely directed flights 196 and 197 are separated at the mid-area of the rotatable brush 176a by short strip 198 of bristles. The inner ends of flights 196 and 197 begin at opposite ends of strip 198. The short strip 198 of bristles does not spiral but extends in the longitudinal direction of the rotatable brush 176a. In the arrangement shown in FIG. 15, there are in fact provided a pair of short strips 198 of bristles, disposed at 180 degrees about the circumference of the outer surface 195 of the core member 194, and each of the oppositely directed flights 196 and 197 consist of a co-existing pair of flights 196' & 196" and 197' & 197", respectively, which remain constantly spaced in the progression from the center towards the outer ends. Flights 196' and 197' commence at opposite ends of one short path 198 of bristles, and flights 196" and 197" commence at opposite ends of the other short path 198.

The nature of spreading achieved by the location and design of rotating brush 176a is significantly different than that of the standard rotating brush 176 described above. The effect of the outwardly travelling flights 196 and 197 is to impart a direction of travel of the particles of material falling from the upper flight 34 of the continuous belt 33 not only rearwardly and/or slightly upwardly but also slightly sideways as depicted at 99 in FIG. 15. The exception to this is at the central portion of the brush where the short paths 198 of bristles tend to expell the particles mainly upwardly and rearwardly so as to distribute material to the middle of the path of travel. This results in the even spreading of a path on the turf slightly wider than the length of the brush. The result is that the top dressing can be carried out with fewer passes, and because the width of the path is slightly greater than the wheel tracks of the machine, it is unnecessary to overlap the tire tracks during successive passes and thereby decrease damage to the turf grass surface. It has further been found that the design of the rotatable brush 176a has good distribution characteristics on a number of varied materials such as sand, soil, compost, wood chips and gravel. It is further capable of equally well broadcasting light or heavy applications. The material can be spread very lightly up and into the air, thus creating a dusting condition of material which has been found to effectively penetrate the turf canopy making the material almost invisible to the eye, causing less tracking, and providing much better mowing conditions.

While in relation to the description of the rotatable brush 176a there has been described the provision of strips of bristles, it is apparent that elements other than bristles may be used. For example, such elements may be in the form of relatively stiff narrow plastic strips. Alternatively, the spiralling strip of bristles could be replaced with a continuous spiralling strip of flat rubber material, or even a spiral metal strip. However, elements in the form of bristles appear practical insofar as wear characteristics are concerned and the bristles do not adversely affect granular material such as fertilizer particles. Moreover, while it is preferable to provide the strips in the described spiralling pattern to obtain the slight side-ways distribution, the strips may not be continuous, or indeed spiral, to obtain only the desired upwardly and rearwardly travel of the material under some conditions. Furthermore, in situations where it is not essential to obtain some side-ways distribution, it may not be essential to have the bristles or such elements arranged in strips at all but they could extend from the entire surface of the core member even in a random fashion. However, as explained above it is believed that an arrangement as shown in FIG. 15 has definite advantages.

The broadcasting unit 35b shown in FIGS. 18 and 19 is in the form of a twin spinner, which is capable of distributing material on a much wider path. The broadcasting unit 35b is again provided with a framework 162b adapted for attachment to the apparatus 20 provided with quick attachment features allowing the unit 35b to be connected to an operative position at the rear of the apparatus 20 in a period of a few minutes without the requirement of any tools. A framework 162b of the broadcasting unit 35b again includes side members 172b, 173b, each having a forward upper portion which is provided with an upwardly extending slot 183b. The forward vertical edges of the side members 172b,173b have a continuous abutment plate 181 b attached thereto for engagement with the rear faces 163,163 of the abutment plates 105,105. Properly located elongated slots 187,187 are provided at opposite ends of abutment plate 181b for reception of posts 106,106 so as to provide a safety lock 186 in the attachment system.

Suspended from side members 172b and 173b is a compound hopper 200 having an upper forward edge 201 adapted to be located below and forward of the rear end of the belt cartridge 32, so that all of the material being discharged from the upper flight 34 is collected in the compound hopper 200. The compound hopper is divided into two separate downwardly converging compartments 202 positioned to each receive one half of the collected material, and each compartment 202 having a bottom opening 203. Protruding from the upper rear edge of the compound hopper 20 is a pair of spaced handles 209,209 providing hand-hold openings near opposite ends of the hopper for convenience in mounting and removing the twin spinner apparatus forming broadcasting unit 35b. Carried below the compound hopper 200 by a downwardly depending sub-frame member 204 is a pair of twin spinner units 205,205 each driven by an independent motor means 42b, 42b driven in series by fluid delivered from hydraulic supply line 46. The units 205,205 each include a circular, rotatable delivery plate 206 mounted on a common axes of the output of the motor means 42b,42b and drivingly connected thereto. A shield 208 encircles a portion of the forward edge of the circular plate. In the usual fashion, an upper surface of each delivering plate 206 is provided with a plurality of affixed, radially extending paddle members 207 which engage the material falling through the bottom openings 203,203 of the two compartments 202,202 and thereby flings the particles of the material out through the side and rear open area behind the shield 208. It is to be noted that while axes F,F, of rotation of the delivering plates 206 are in a common vertical transverse plane, as viewed in FIG. 19, the axes F,F of rotation of the delivering plates do in fact converge slightly towards each other in that plane, as can be seen from the rear view of FIG. 18. Such an arrangement enhances the side-ways range of distributing from the broadcasting unit 35b of the present invention.

While a number of embodiments of the present invention have been disclosed herein, various modifications within the spirit of the present invention as defined in the appending claims will be obvious to those skilled in the art.

What I claim is:

1. A material spreading apparatus of the type for movement over a ground surface while broadcasting a material along a path on said ground surface, said apparatus including:

a chassis, a hopper carried on said chassis for containing said material and defining an opening for metered flow of said material from said hopper, a conveyor system for receiving said material from said opening of said hopper and delivering said material to one end of said chassis, and a material broadcasting unit attached to said one end of said chassis for receiving said material from said conveyor system and distributing said material over said path on said ground surface;

said conveyor system being in the form of a self-contained belt cartridge comprising:

a separate framework including a pair of side rails, a continuous belt, and mounting means carried between said side rails and drivingly supporting said continuous belt to provide an upper material conveying flight movable in a direction from one end of said self-contained belt cartridge to the other;

said chassis having means forming ledges supporting said framework of said self-contained belt cartridge thereon for removably mounting said self-contained belt cartridge in an operative position within said chassis, said ledges of said chassis and said framework of said self-contained belt cartridge being so constructed and arranged that said self-contained belt cartridge is removable from said chassis as an assembled unit.

2. A material spreading apparatus of the type for movement over a ground surface while broadcasting a material along a path on said ground surface, said apparatus including:

a chassis, said chassis including a pair of laterally spaced side walls having inner opposed surfaces extending to an open rear end of said chassis, a hopper carried on said chassis for containing said material and defining an opening for metered flow of said material from said hopper;

a conveyor system for receiving said material from said opening of said hopper and delivering said material to one end of said chassis;

a material broadcasting unit attached to said one end of said chassis for receiving said material from said conveyor system and distributing said material over said path on said ground surface;

said conveyor system being in the form of a self-contained belt cartridge, said conveyor system including:

a framework including a pair of side rails, a continuous belt, and mounting means carried between said side rails and drivingly supporting said continuous belt to provide an upper material conveying flight movable in a direction from one end of said cartridge to the other;

said chassis having means forming ledges for removably mounting said belt cartridge in an operative position within said chassis;

said ledges being in the form of opposed inturned flanges formed on said inner opposed surfaces of said side walls;

said side rails of said belt cartridge having outer side surfaces spaced for close reception between said inner opposed surfaces of said side walls and bottom surfaces for resting on said inturned flanges, whereby said belt cartridge can be slid endwise into an operative position from behind said chassis.

3. A material spreading apparatus as defined in claim 2, wherein;

first attachment components are provided on said side walls adjacent said rear end of said chassis, said material broadcasting unit has second attachment components engageable with said first attachment components to provide suspension of said unit behind said chassis, and said first and second attachment components providing a lift-on and lift-off type connection means between said unit and said rear end of said chassis, whereby on removal of said broadcasting unit from said chassis said belt cartridge is removable from said rear end of said chassis.

4. A material spreading apparatus of the type for movement over a ground surface while broadcasting a material along a path on said ground surface, said apparatus including:

a chassis, a hopper carried on said chassis for containing said material and defining an opening for metered flow of said material from said hopper;

a conveyor system for receiving said material from said opening of said hopper and delivering said material to one end of said chassis, and a material broadcasting unit attached to said one end of said chassis for receiving said material from said conveyor system and distributing said material over said path on said ground surface;

said conveyor system being in the form of a self-contained belt cartridge comprising:

a separate framework including a pair of side rails, a continuous belt, mounting means carried between said side rails and drivingly supporting said continuous belt to provide an upper material conveying flight movable in a direction from one end of said self-contained belt cartridge to the other, said mounting means including:

an intermediate member removably connected between said side rails and defining a top plate portion for supporting a top flight of said continuous belt, a tension adjustment roller rotatably mounted between a front end of said rails forward of said intermediate member, and a drive roller rotatably mounted between a rear end of said rails rearwardly of said intermediate member, said continuous belt being entrained around said tension adjustment roller and said drive roller; and said chassis having means forming ledges supporting said framework of said self-contained belt cartridge thereon for removably mounting said self-contained belt cartridge in an operative position within said chassis.

5. A material spreading apparatus of the type for movement over a ground surface while broadcasting a material along a path on said ground surface, said apparatus comprising:

a chassis;

a hopper carried on said chassis for containing said material and defining an opening for metered flow of said material from said hopper;

a conveyor system for receiving said material from said opening of said hopper and delivering said material to one end of said chassis;

a material broadcasting unit attached to said one end of said chassis for receiving said material from said conveyor system and distributing said material over said path on said ground surface;

said conveyor system being in the form of a self-contained belt cartridge comprising:

a framework including a pair of side rails, a continuous belt, mounting means carried between said side rails and drivingly supporting said continuous belt to provide an upper material conveying flight movable in a direction from one end of said cartridge to the other, and including:

an intermediate member removably connected between said side rails and defining a top plate portion for supporting a top flight of said continuous belt, a tension adjustment roller rotatably mounted between a front end of said rails forward of said intermediate member, and a drive roller rotatable mounted between a rear end of said rails rearwardly of said intermediate member, said continuous belt being entrained around said tension adjustment roller and said drive roller;

said chassis having means forming ledges for removably mounting said belt cartridge in an operative position within said chassis;

said continuous belt having a generally uninterrupted flat inner surface between opposite side edges thereof for engagement with said rollers and including a pair of continuous ridges projecting inwardly from said flat inner surface of said belt, one each of said ridges being adjacent to and extending parallel to one of said side edges of said continuous belt, said ridges providing continuous opposed abutment surfaces projecting inwardly from said flat inner surface of said belt; and at least one of said rollers having end surface areas spaced inwardly of said side rails, whereby engagement of said opposed abutment surfaces of said ridges adjacent said side edges of said continuous belt with said end surface areas of said at least one roller maintains proper self-tracking alignment of said continuous belt about said rollers.

6. A material spreading apparatus of the type for movement over a ground surface while broadcasting a material along a path on said ground surface, said apparatus comprising:

a chassis including a pair of laterally spaced side walls having rear ends at a rear end of said chassis, a hopper for containing said material and defining an opening for metering flow of said material from said hopper, a conveyor system located between said side walls for receiving said material from said opening of said hopper and delivering said material to a rear end thereof adjacent the rear end of said chassis, a plurality of interchangeable broadcasting units for attachment to said rear end of said chassis and for receiving said material from said conveyor system and distributing said material over said path on said ground surface,.

a first attaching means carried on each of said side walls adjacent to but forward of said rear ends of said side walls, a first abutment means carried at said rear end of said chassis, each of said broadcasting units including:

a frame supporting a main body portion for positioning rearwardly of said rear end of said chassis when said broadcasting unit is attached to said chassis, second abutment means formed at a forward side of said main body portion, said frame of the broadcasting unit having forwardly projecting portions substantially aligned with said side walls of said chassis, second attaching means on said forwardly projecting portion of said frame for interacting with said first attaching means to interlock therewith and thereby suspend said broadcasting unit behind said rear end of said chassis, said main body portion of said broadcasting unit providing a center of gravity of said unit when attached rearwardly of said rear end of said chassis, whereby on suspending said broadcasting unit by way of said attachment means, said second abutment means is held in engagement with said first abutment means under normal operating conditions.

7. A material spreading apparatus as defined in claim 6, wherein;

one of said first attaching means and said second attaching means includes a transversely extending member, the other of said first attaching means and said second attaching means includes a slot forming member for receiving said transversely extending member for suspending said broadcasting unit.

8. A material spreading apparatus as defined in claim 7, wherein;

said one of said attaching means includes an adjustable means for varying a set position of said attaching means in the vertical direction, whereby vertically position of the broadcasting unit relative to the rear end of said chassis may be selected.

9. A material spreading apparatus as defined in claim 6, wherein;

said frame of said broadcasting unit includes side members having an upper part thereof forming said forwardly projection portions, each of said side walls having an upper portion thereof supporting means defining a transversely extending member forming said first attaching means, and said forwardly projecting portions of said each side members of said broadcasting unit being formed with a lower edge having an upwardly extending slot therein for reception of said transversely extending member on each side wall to thereby provide a connection for suspending said broadcasting unit.

10. A material spreading apparatus as defined in claim 9, wherein said means forming said transversely extending member includes an upwardly open clevis member supporting a cross pin, said clevis member having a downwardly projecting shank attached to a horizontal top portion of said side wall.

11. A material spreading apparatus as defined in claim 10, wherein;

said shank of said clevis member is threaded, and said horizontal top portion of said side wall defines a threaded opening for receiving said threaded shank, whereby turning of said clevis member adjusts the height of said cross pin above said side wall.

12. A material spreading apparatus as defined in claim 9, wherein
said upwardly extending slot in said lower edge of said forwardly projecting portion of said broadcasting unit is curved slightly forward.

13. A material spreading apparatus as defined in claim 6 wherein;
said first abutment means carried at the rear of said chassis includes a plate member defining a rear abutment surface disposed in a substantially vertical transverse plane, and
said second abutment means includes a second plate member defining a front abutment surface disposed in a substantially vertical plane, and
further comprising a safety lock means including a post element affixed to the abutment surface of one of said abutment plates and extending outwardly therefrom,
the other of said abutment plates having an opening therethrough for reception of said post therethrough,
said post having an outer end portion for reception of a cIIp pin,
whereby substantial separation of such abutment surfaces is prevented.

14. A material spreading apparatus as defined in claim 13, wherein;
said opening in said abutment plate is elongated in the vertical direction to permit limited vertical movement of said broadcasting unit relative to said chassis.

15. A broadcasting unit for use in a material spreading apparatus of the type for movement over a ground surface while broadcasting a material along a path of said ground surface, said material spreading apparatus including:
a chassis forming a laterally spaced pair of side opposed walls defining a space therebetween and having ends at one end of said chassis;
a hopper means carried on said chassis for containing said material and defining an opening permitting material to flow from the hopper;
a conveyor system disposed between said side walls of said chassis for receiving material from said opening of said hopper and delivering said material to said one end of said chassis,
said conveyor system including a material carrying top flight having a width substantially spanning said space between said side walls and forming a drop-off end for said material between said ends of said side walls;
said broadcasting unit being mountable on one end of said chassis for thereby receiving material from said drop-off end and distributing said material along said strip of ground surface and comprising:
a frame including a pair of spaced side members,
an elongated rotatable member mounted between said side members and having a length substantially equal to said width of said top flight of said conveyor system,
said rotatable member being formed of a central core member and a plurality of radially projecting, material engaging elements affixed at inner ends to said core member and having outer ends disposed in an outer peripheral shape of generally cylindrical configuration,
said plurality of radially projecting, material engaging elements being arranged in spaced strips of said elements,
said strips of elements extending substantially along the length of said core member,
said strips of elements including at least first and second strips of elements,
said first strip spiralling about said core member from a mid-area of said rotatable member to one end of said rotatable member,
the second strip spiralling about said core member from said mid-area of said rotatable member to the other end of said rotatable member,
said first and second strips spiralling about said core member in opposite directions to form flights of said elements each progressing towards its respective end of said core member on rotation of said rotatable member in said driven direction;
drive means for rotating said rotatable member in a driven direction causing the top of the periphery of rotatable member disposed below the drop-off end of the conveyor system to travel in a direction away from said one end of said chassis,
whereby material dropping from said drop-off end and engaged by said elements is propelled in a direction having components of travel both rearwardly away from said chassis and slightly upwardly, and contact of said flights with the material dropping from said drop-off end of said conveyor system further imparts a component of side-ways travel to said material.

16. A broadcasting unit as defined in claim 15, wherein:
said mid-area of said rotatable member includes a third strip of said elements extending in a straight longitudinal direction,
said first and second strips continuing from opposite ends of said third strip to the opposite end of said rotatable member.

17. A broadcasting unit as defined in claim 15 wherein said elements comprise a multiplicity of bristles.

* * * * *

UNITED STATES PATENT AND TRADEMARK OFFICE
CERTIFICATE OF CORRECTION

PATENT NO. : 6,202,944 B1
DATED : March 20, 2001
INVENTOR(S) : Kevin Richard McCrory It is certified that error appears in the above-identified patent and that said Letters Patent is hereby corrected as shown below:

Claim 5, Column 19,
Line 21, the word "rotatable" should read -- rotatably --.

Signed and Sealed this

Twenty-eighth Day of August, 2001

Attest:

NICHOLAS P. GODICI
Attesting Officer
Acting Director of the United States Patent and Trademark Office

UNITED STATES PATENT AND TRADEMARK OFFICE
Certificate

Patent No. 6,202,944 B1                                                                Patented: March 20, 2001

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: David Michael Hamoline, MaMalispina, Powell River, B.C., Canada; and Kevin Richard McCrory, Chilliwack, CA.

Signed and Sealed this Seventeenth Day of September 2002.

MICHAEL MAR
*Supervisory Patent Examiner*
Art Unit 3752